US012593150B2

(12) United States Patent　　　(10) Patent No.: US 12,593,150 B2
Iwahara　　　　　　　　　　　　　(45) Date of Patent: Mar. 31, 2026

(54) IMAGE CAPTURING APPARATUS, CONTROL METHOD THEREOF, AND STORAGE MEDIUM

(71) Applicant: CANON KABUSHIKI KAISHA, Tokyo (JP)

(72) Inventor: Tomonaga Iwahara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 58 days.

(21) Appl. No.: 18/742,464

(22) Filed: Jun. 13, 2024

(65) Prior Publication Data

US 2024/0430596 A1　　Dec. 26, 2024

(30) Foreign Application Priority Data

Jun. 23, 2023　(JP) ................................. 2023-103598
Apr. 4, 2024　(JP) ................................. 2024-060971

(51) Int. Cl.
　H04N 25/76　　　(2023.01)
　H04N 25/78　　　(2023.01)

(52) U.S. Cl.
　CPC ......... H04N 25/7795 (2023.01); H04N 25/78 (2023.01)

(58) Field of Classification Search
　CPC .... H04N 25/7795; H04N 25/78; H04N 25/67; H04N 25/778
　See application file for complete search history.

(56) References Cited

U.S. PATENT DOCUMENTS

| 2009/0190018 | A1* | 7/2009 | Sakakibara | ............ | H04N 25/65 348/308 |
| 2013/0229543 | A1* | 9/2013 | Hashimoto | ............ | H04N 25/78 348/222.1 |

| 2015/0062394 | A1* | 3/2015 | Ikeda | ..................... | H04N 25/44 348/301 |
| 2015/0195463 | A1* | 7/2015 | Koh | ........................ | H04N 25/78 348/302 |
| 2016/0234425 | A1* | 8/2016 | Katagawa | ............ | H04N 23/672 |
| 2017/0155855 | A1* | 6/2017 | Ito | ........................ | H04N 25/618 |
| 2019/0165014 | A1* | 5/2019 | Wada | ..................... | H04N 25/42 |
| 2020/0265909 | A1* | 8/2020 | Matsuura | ............ | H04N 25/616 |
| 2021/0281784 | A1* | 9/2021 | Okada | .................. | H04N 25/616 |
| 2021/0344868 | A1* | 11/2021 | Iwata | ..................... | H04N 23/50 |

FOREIGN PATENT DOCUMENTS

| JP | 5755111 | B2 | 7/2015 |
| JP | 2022119484 | A | 8/2022 |

* cited by examiner

*Primary Examiner* — Jason A Flohre

(74) *Attorney, Agent, or Firm* — Cowan, Liebowitz & Latman, P.C.

(57)　　　　　　ABSTRACT

An image capturing apparatus includes a pixel portion in which pixels, first and second sample-hold circuits that are two sample-hold circuits arranged with respect to pixel signals output from one pixel, a voltage-current conversion circuit configured to output a difference between the first and second sample-hold circuits, as a current signal, an AD converter configured to convert an output signal of the voltage-current conversion circuit to a digital signal, and a controller configured to perform control such that, a first pixel signal obtained from the pixel is held in the second sample-hold circuit and is AD converted, in a first period, and the first pixel signal and a second pixel signal that are obtained from the pixel are held in the second sample-hold circuit and the held signal is AD converted, in a second period.

9 Claims, 18 Drawing Sheets

F I G.  1
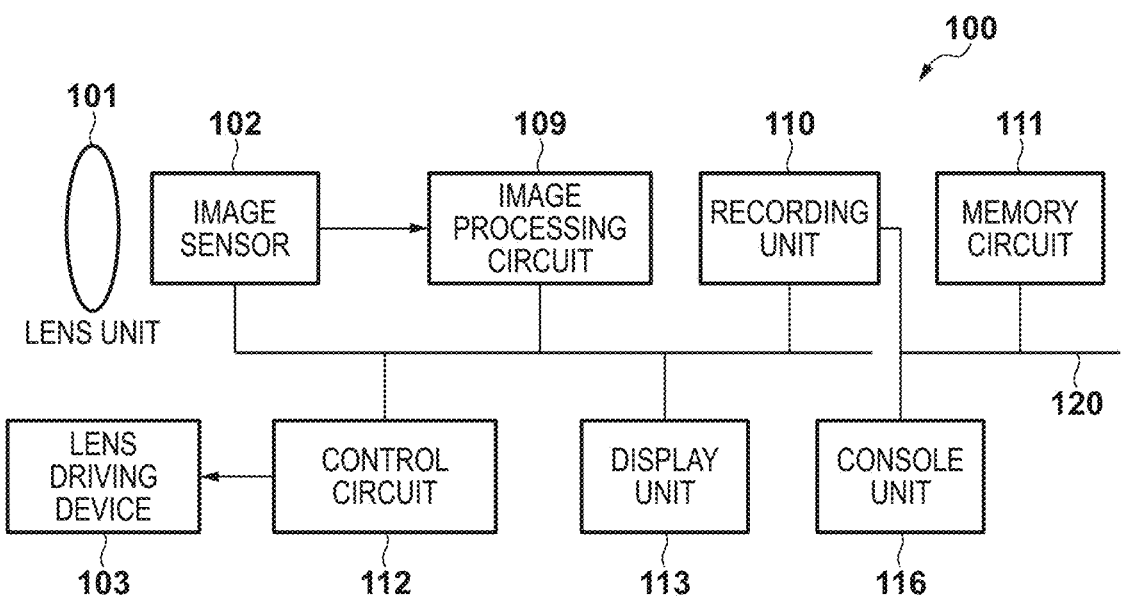

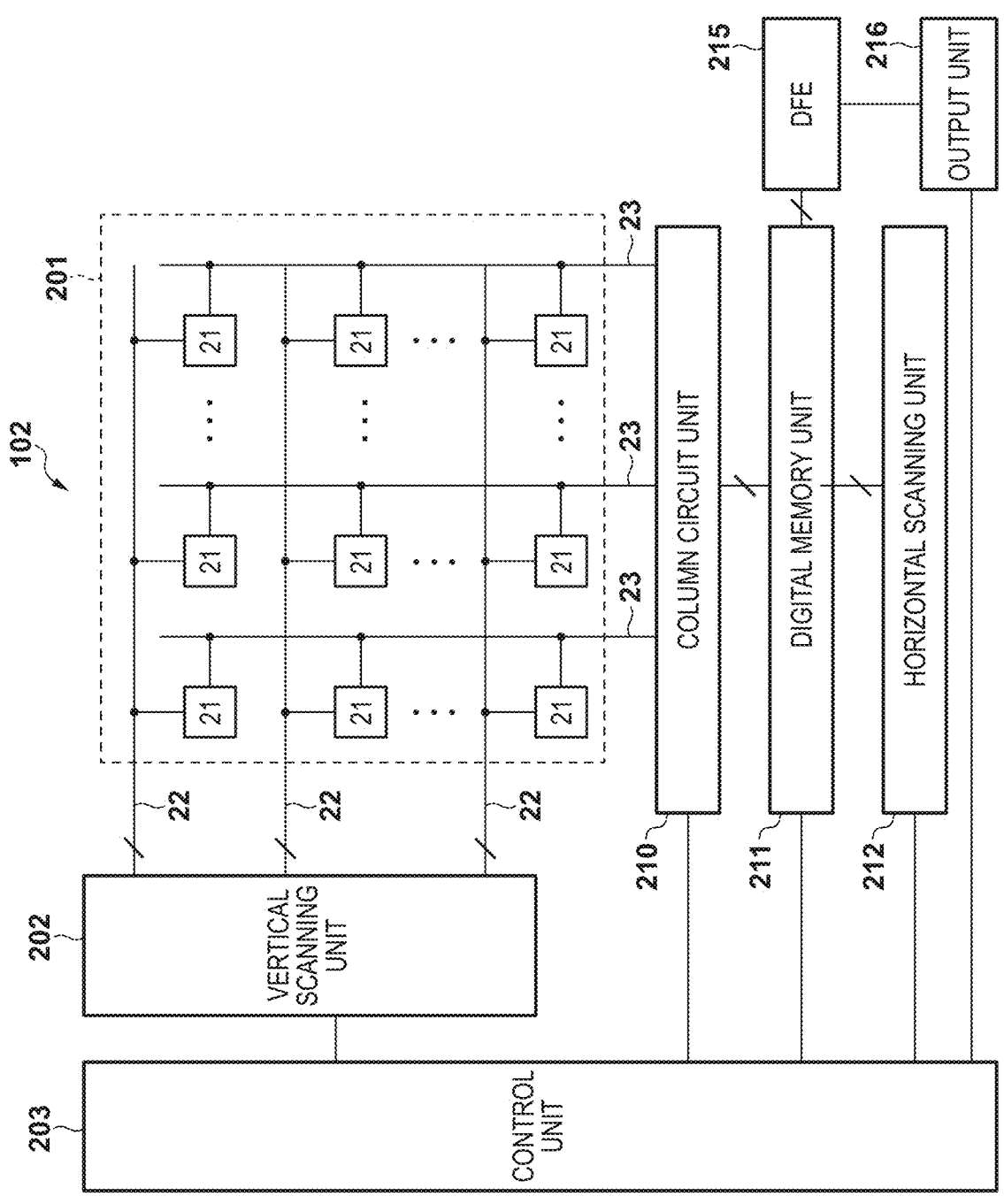
F I G. 2

F I G. 3
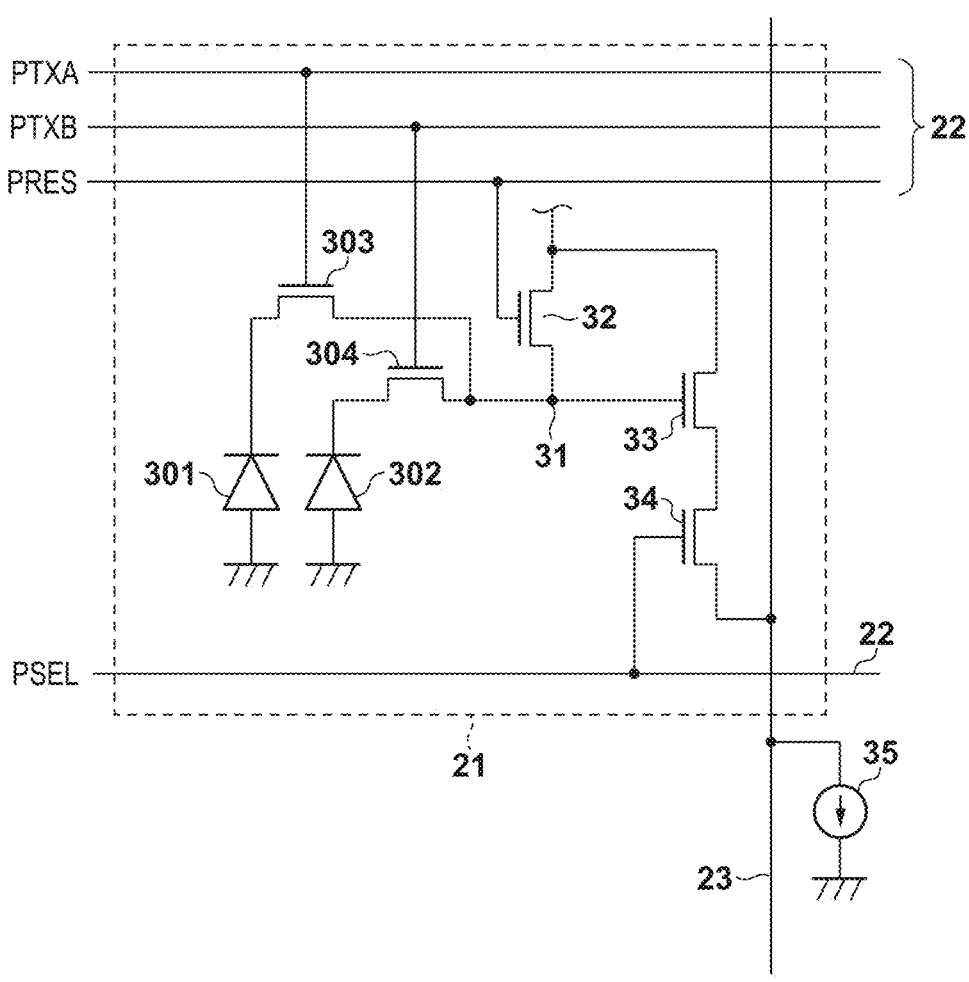

F I G. 6
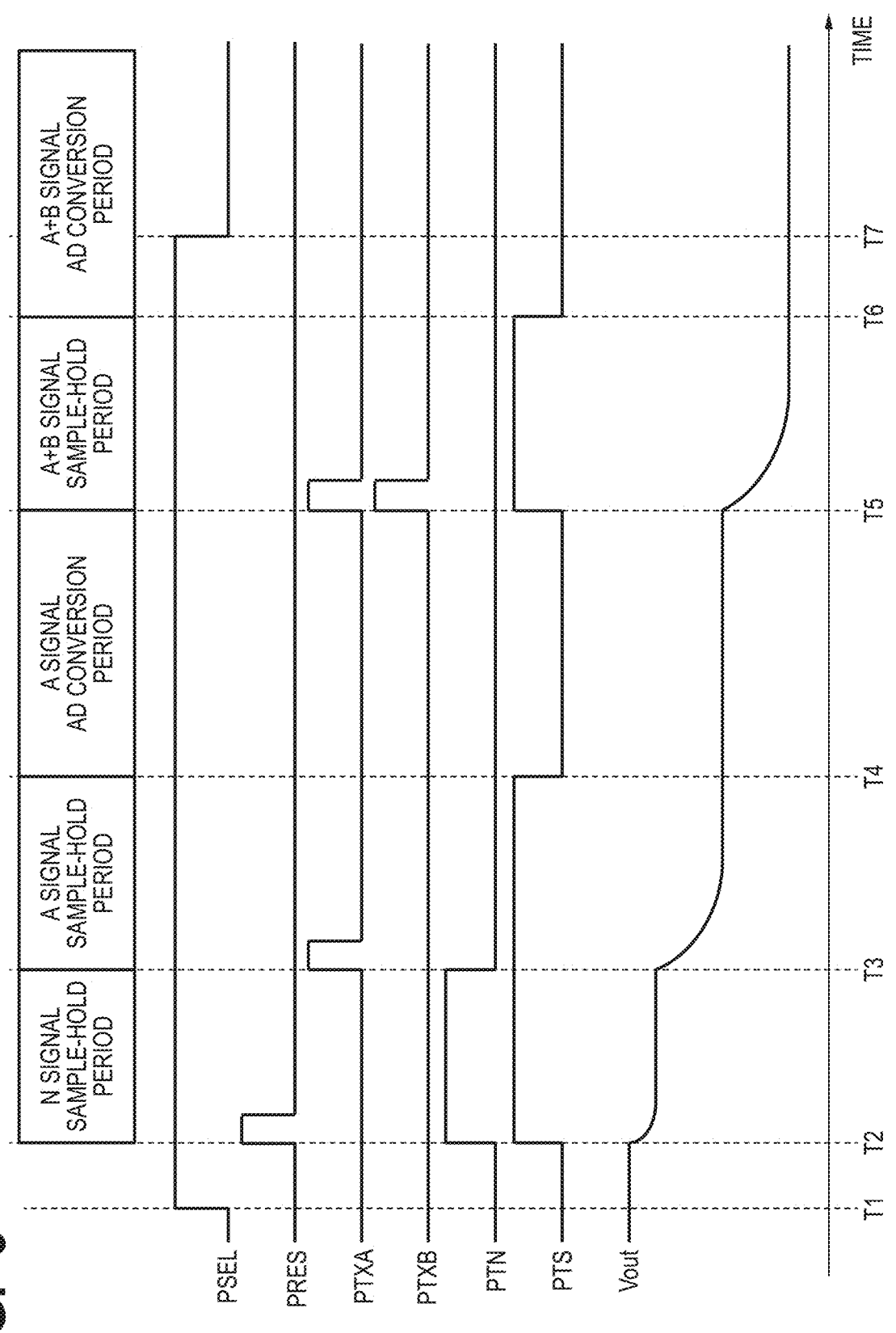

F I G. 13
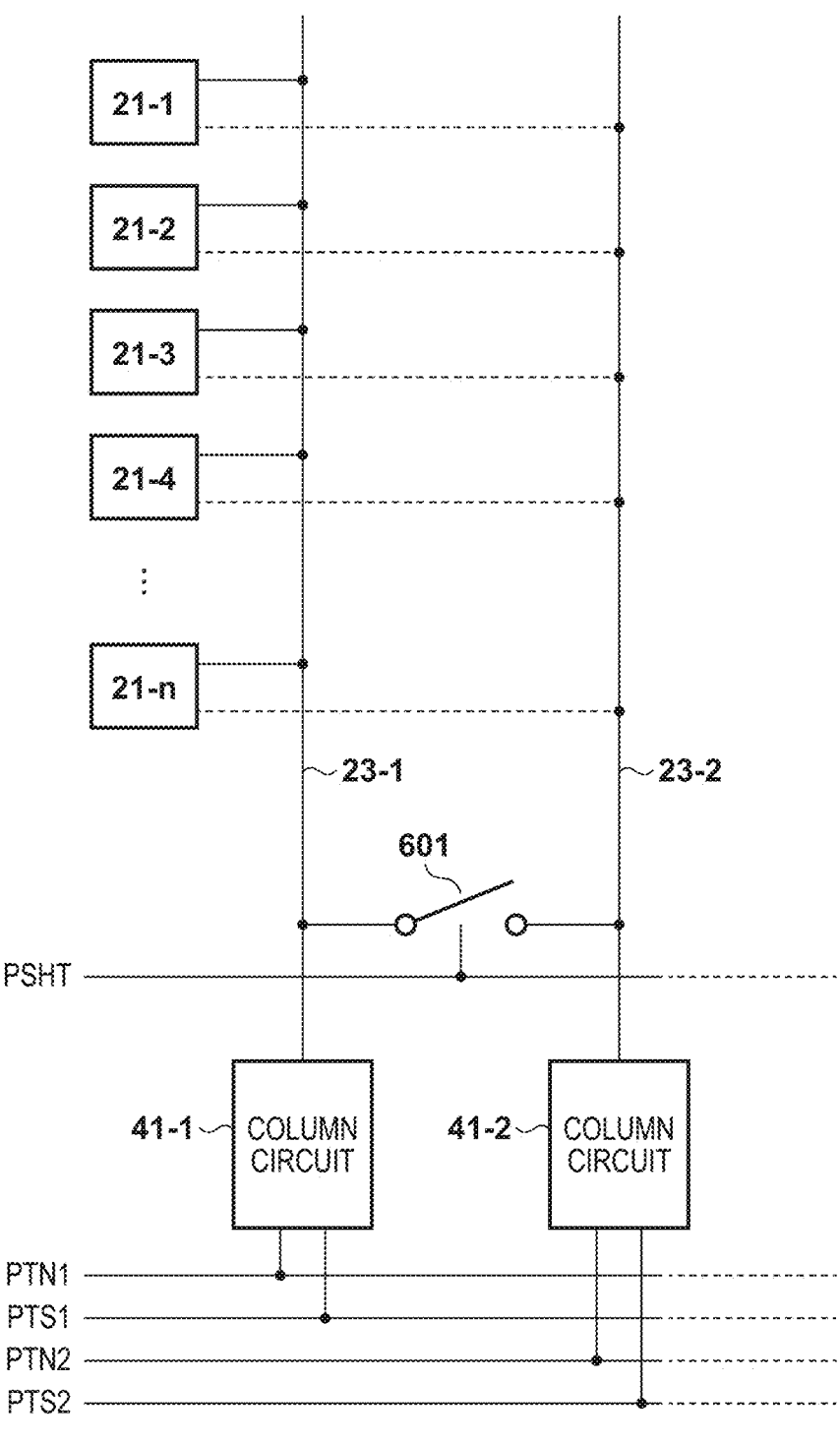

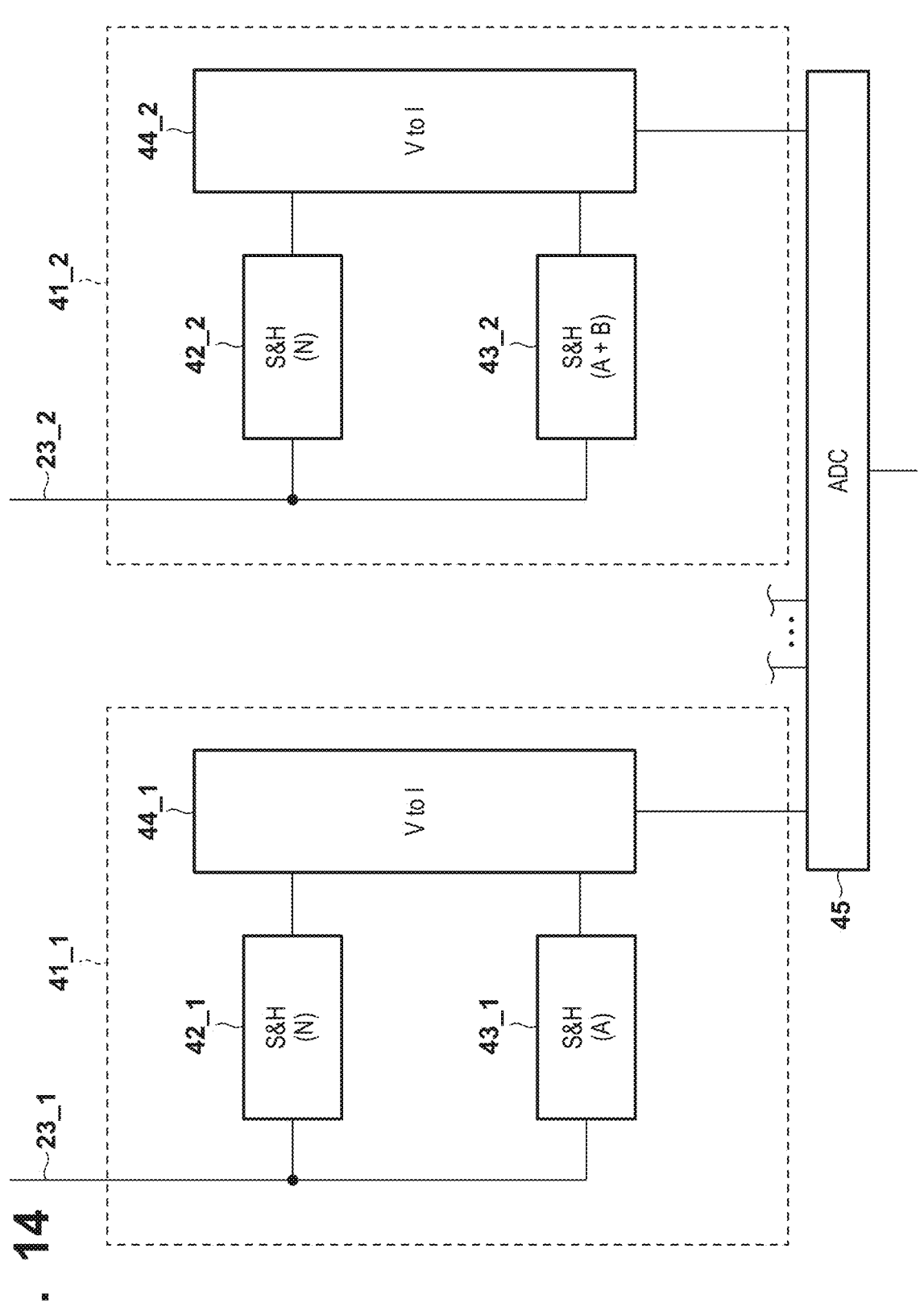
F I G. 14

F I G. 15

F I G.  17
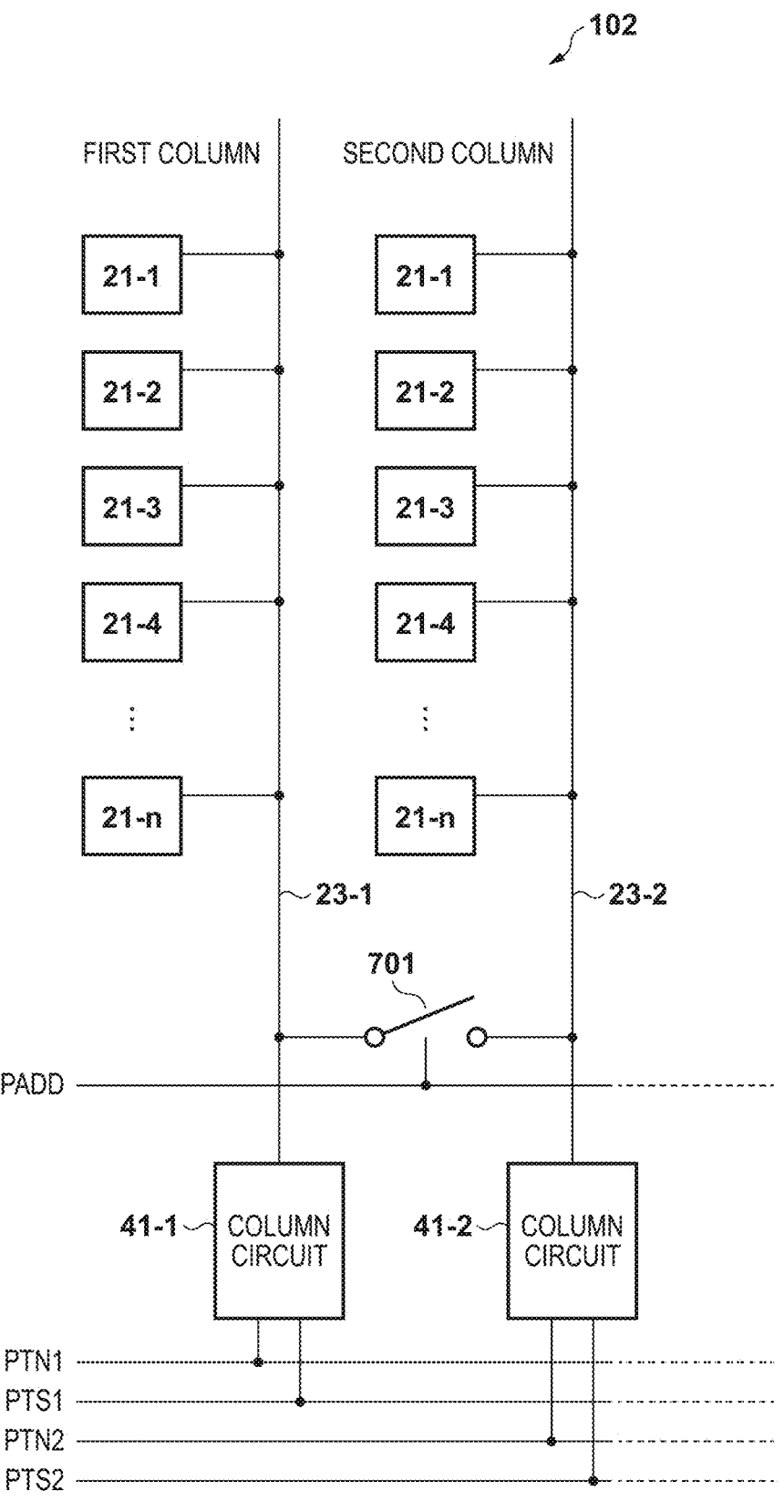

IMAGE CAPTURING APPARATUS, CONTROL METHOD THEREOF, AND STORAGE MEDIUM

BACKGROUND OF THE INVENTION

Field of the Invention

The present invention relates to an image capturing apparatus and a control method thereof.

Description of the Related Art

Heretofore, a technique is known in which a plurality of photoelectric conversion elements are provided in one pixel of an image sensor, and focus detection is performed using output signals from the plurality of photoelectric conversion elements.

In Japanese Patent No. 5755111, an image capturing apparatus is disclosed in which focus detection can be performed using an image sensor in which each pixel includes one microlens and a plurality of photoelectric conversion elements. In Japanese Patent No. 5755111, after a reset signal of one pixel is read out, a signal based on charges of at least one photoelectric conversion element is read out from the one pixel, and thereafter a signal based on charges of the plurality of photoelectric conversion elements are read out from the one pixel.

Also, in Japanese Patent Laid-Open No. 2022-119484, the following configuration of a photoelectric conversion apparatus is disclosed. That is, two sample-hold circuits are provided in parallel with respect to one column output line, one sample-hold circuit holds a reset signal of one pixel, and the other sample-hold circuit holds a photodetection signal of the one pixel. Then, a current based on the difference between the photodetection signal and the reset signal is output to an AD conversion unit, and correction processing is performed using correlated double sampling between the photodetection signal and the reset signal.

However, when the signal for focus detection described in Japanese Patent No. 5755111 is read out using the configuration described in Japanese Patent Laid-Open No. 2022-119484, a reset signal read out from one pixel, a signal based on charges of at least one photoelectric conversion element, and a signal based on charges of a plurality of photoelectric conversion elements each need to be sample-held.

That is, at lest three sample-hold circuits need to be provided in parallel, and therefore the circuit area of the image sensor increases, which hampers miniaturization of the pixel and reduction of the chip size.

SUMMARY OF THE INVENTION

The present invention has been made in view of the problem described above, and provides an image capturing apparatus that can, when one pixel includes a plurality of photoelectric conversion elements, suppress the increase in the circuit area.

According to a first aspect of the present invention, there is provided an image capturing apparatus comprising: a pixel portion in which pixels each including a photoelectric conversion element are arranged in a matrix; first and second sample-hold circuits that are two sample-hold circuits arranged with respect to pixel signals output from one pixel; a voltage-current conversion circuit configured to output a difference between the first and second sample-hold circuits, as a current signal; an AD converter configured to convert an output signal of the voltage-current conversion circuit to a digital signal; and a controller configured to perform control such that, a first pixel signal obtained from the pixel is held in the second sample-hold circuit and is AD converted, in a first period, and the first pixel signal and a second pixel signal that are obtained from the pixel are held in the second sample-hold circuit and the held signal is AD converted, in a second period.

According to a second aspect of the present invention, there is provided a method of controlling an image capturing apparatus including: a pixel portion in which pixels each including a photoelectric conversion element are arranged in a matrix; first and second sample-hold circuits that are two sample-hold circuits arranged with respect to pixel signals output from one pixel; a voltage-current conversion circuit configured to output a difference between the first and second sample-hold circuits, as a current signal; and an AD converter configured to convert an output signal of the voltage-current conversion circuit to a digital signal, the method comprising: performing control such that, a first pixel signal obtained from the pixel is held in the second sample-hold circuit and is AD converted, in a first period, and the first pixel signal and a second pixel signal that are obtained from the pixel are held in the second sample-hold circuit and the held signal is AD converted, in a second period.

Further features of the present invention will become apparent from the following description of exemplary embodiments with reference to the attached drawings.

BRIEF DESCRIPTION OF THE DRAWINGS

FIG. 1 is a block diagram of an image capturing apparatus.

FIG. 2 is a simplified configuration diagram of an image sensor.

FIG. 3 is an equivalent circuit diagram of a unit pixel.

FIG. 6 is a timing chart of a read-out operation.

FIG. 13 is a simplified configuration diagram of an image sensor of a fifth embodiment.

FIG. 14 is a simplified block diagram of a column circuit of the fifth embodiment.

FIG. 15 is a diagram illustrating an exemplary configuration of the column circuit of the fifth embodiment.

FIG. 17 is a simplified configuration diagram of an image sensor of the sixth embodiment.

DESCRIPTION OF THE EMBODIMENTS

Figure 4:
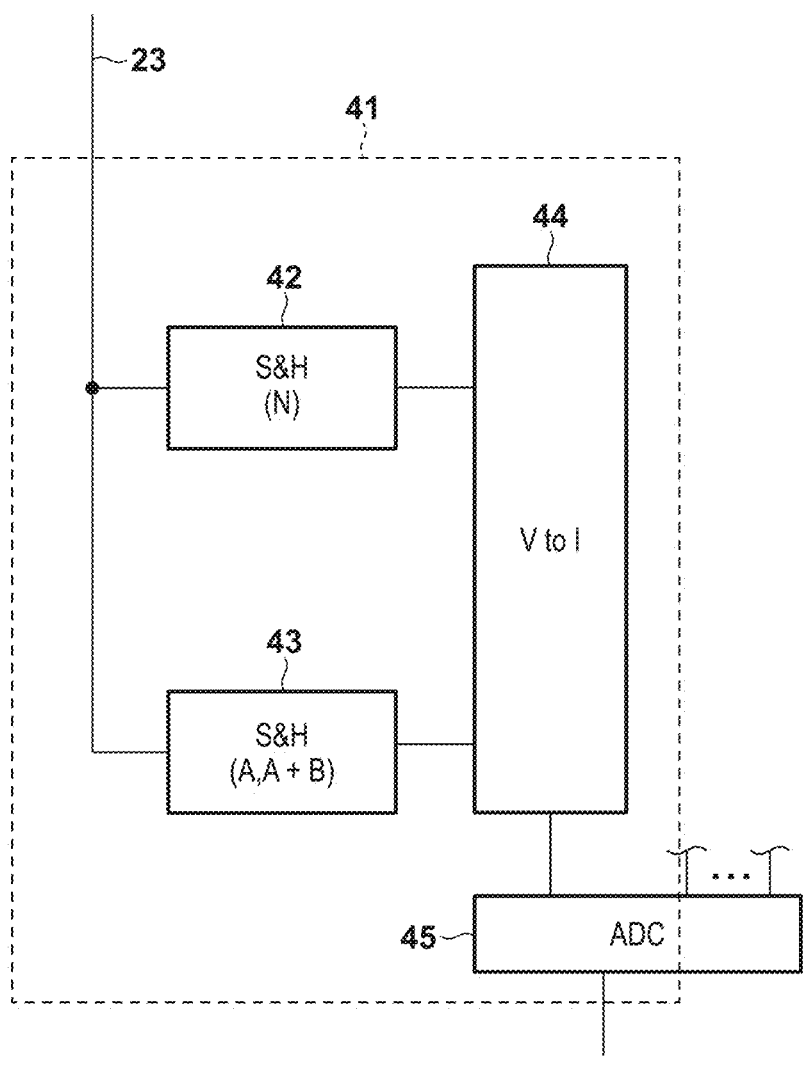
FIG. 4 is a simplified block diagram of a column circuit.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 in a block diagram illustrating a configuration of an image capturing apparatus according to an embodiment of the present invention. An image capturing apparatus 100 is an image capturing apparatus that can perform focus detection on an imaging plane.

A lens unit 101 collects incident light from a subject, and forms a subject image on an image sensor 102. The lens unit 101 is constituted by a plurality of lenses, an aperture, and the like, for example, and zoom control, focus control, aperture control, and the like are performed thereon by a lens driving device 103.

A control circuit 112 performs some of control of image processing of an image processing circuit 109 and driving of an image sensor 102. Also, the control circuit 112 controls reception of instructions from a display unit 113 and a console unit 116, and data transfer to and from a memory circuit 111 and a recording unit 110. Also, the control circuit 112 performs focus detection computation based on image data from the image processing circuit 109, and causes the lens driving device 103 to perform focus adjustment by the lens unit 101. Note that the control circuit 112 may be incorporated in the image sensor 102 or the image processing circuit 109, for example.

The image processing circuit 109 performs development processing such as color matrix processing and gamma processing on image data from the image sensor 102. In such processing, the image processing circuit 109 causes the memory circuit 111 to retain image data, as needed. Also, the image processing circuit 109 outputs processed image data to the display unit 113 or the recording unit 110. The display unit 113 includes a display device for displaying processed image data and the like. The console unit 116 generates an operation signal according to the operation performed by a user. A bus 120 is a common path for exchanging data between the image sensor 102, the image processing circuit 109, the display unit 113, the console unit 116, the recording unit 110, and the memory circuit 111.

FIG. 2 is a simplified configuration diagram of the image sensor 102. The image sensor 102 includes a pixel array portion 201, a vertical scanning unit 202, a column circuit unit 210, and a digital memory unit 211, as shown in FIG. 2. Also, the image sensor 102 includes a horizontal scanning unit 212, a digital signal processing unit 215 (may also be denoted as Digital Front End (DFE)), an output unit 216, and a control unit 203.

In the pixel array portion 201, a plurality of pixels 21 are arranged in a matrix, a line in a vertical direction is referred to as a "column", and a line in a horizontal direction is referred to as a "row". A portion of the plurality of pixels 21 that constitute the pixel array portion 201 is shown in FIG. 2, for the sake of convenience.

A control signal line 22 is arranged in each row of the pixel array portion 201. The control signal lines 22 each include a plurality of control signal lines for supplying a plurality of types of control signals to a plurality of pixels 21. The control signal line 22 in each row is connected to the vertical scanning unit 202.

A column output line 23 is arranged in each column of the pixel array portion 201. The number of column output lines 23 for one column need not be one in the pixel array, and may be two or more. The column output line 23 is connected to the column circuit unit 210.

The vertical scanning unit 202 receives a control signal output from the control unit 203, and generates control signals for driving the plurality of pixels 21, and supplies the control signals to the plurality of pixels 21 through the control signal lines 22. A logic circuit such as a shift register or an address decoder is used in the vertical scanning unit 202. The vertical scanning unit 202 performs control such that signals are read out by selecting a plurality of pixels 21 in the pixel array portion 201 in units of row, and the signals of the plurality of pixels 21 are output to the column circuit unit 210 through the column output lines 23.

The column circuit unit 210 includes a plurality of sample-hold circuits for holding signals of the column output lines, a plurality of voltage-current conversion circuits, and a plurality of AD converters, and performs signal processing including correlated double sampling and AD conversion. A specific configuration of the column circuit unit 210 will be described later.

The digital memory unit 211 is connected to the column circuit unit 210, and has a function of retaining a digital signal for each column that is obtained by performing AD conversion in the column circuit unit 210. The digital memory unit 211 is connected to the control unit 203, and receives a control signal for retaining a digital signal output from the column circuit unit 210, from the control unit 203.

The horizontal scanning unit 212 is connected to the control unit 203, and generates a control signal for reading out a digital signal retained in the digital memory unit 211, based on a control signal from the control unit 203. Then, the horizontal scanning unit 212 causes the digital signals retained in the digital memory unit 211 to be output to the digital signal processing unit 215.

The digital signal processing unit 215 executes signal processing such as amplification processing and correction processing on a digital signal output from the digital memory unit 211.

The output unit 216 is controlled by a control signal from the control unit 203, and is an external interface circuit for outputting a signal input from the digital signal processing unit 215 to an external apparatus. The control unit 203 supplies control signals to the vertical scanning unit 202, the column circuit unit 210, the digital memory unit 211, the horizontal scanning unit 212, and the output unit 216 for controlling the respective units. Note that these control signals need not be supplied from the control unit 203, and may be supplied from the outside of the image sensor 102.

FIG. 3 is a simplified equivalent circuit of a pixel 21. As shown in FIG. 3, the pixel 21 includes a first photoelectric conversion portion 301, a second photoelectric conversion portion 302, a first transfer transistor 303, and a second transfer transistor 304. The pixel 21 further includes a reset transistor 32, an amplification transistor 33, a selection transistor 34, and a floating diffusion portion 31.

The first transfer transistor 303, the second transfer transistor 304, the reset transistor 32, the amplification transistor 33, and the selection transistor 34 are each constituted by an NMOS transistor, for example, but may also be constituted by another transistor.

Each pixel 21 includes a microlens and a color filter, which are not illustrated, on a light path through which incident light is guided to the first photoelectric conversion portion 301 and the second photoelectric conversion portion

5

302. The first photoelectric conversion portion 301 and the second photoelectric conversion portion 302 are photo-diodes, for example.

The first transfer transistor 303 and the second transfer transistor 304 are connected in correspondence with the first photoelectric conversion portion 301 and the second pho-toelectric conversion portion 302, respectively. Also, these transfer transistors are each for transferring a signal of the corresponding photoelectric conversion element to the float-ing diffusion portion 31, which is an input node of the amplification transistor 33.

The floating diffusion portion 31 includes a capacitance component (floating diffusion capacitance) formed by an interconnect capacitance and the like, and has a function of a charge holding portion.

The reset transistor 32 is connected to the floating diffu-sion portion 31, which is the input node of the amplification transistor 33, and supplies a reset voltage thereto. The drains of the reset transistor 32 and amplification transistor 33 are connected to a power supply voltage node.

The amplification transistor 33 amplifies a signal trans-ferred to the floating diffusion portion 31, which is the input node, and outputs the amplified signal to the column output line 23. The selection transistor 34 controls the electrical conduction between the amplification transistor 33 and the column output line 23.

A current source 35 is electrically connected to the column output line 23. The current source 35 supplies a bias current to the amplification transistor 33, and the amplifi-cation transistor 33 and the current source 35 constitute a source follower.

The control signal line 22 from the vertical scanning unit 202 is connected to the first transfer transistor 303, the second transfer transistor 304, the reset transistor 32, the amplification transistor 33, and the selection transistor 34. The control signal line 22 includes four signal lines to which control signals PTXA, PTXB, PRES, and PSEL are respec-tively supplied. These four signal lines are signal lines that are shared by pixels 21 belonging to a corresponding row.

Out of the four signal lines in each row, the signal line of the control signal PTXA is connected to the gate of the first transfer transistor 303, in the pixel 21 of the corresponding row. The signal line of the control signal PTXB is connected to the gate of the second transfer transistor 304. The signal line of the control signal PRES is connected to the gate of the reset transistor 32. The signal line of the control signal PSEL is connected to the gate of the selection transistor 34.

FIG. 4 is a simplified block diagram of a column circuit 41. The column circuit unit 210 is constituted by a plurality of column circuits 41. Each column circuit 41 is connected to at least one of the plurality of column output lines 23 of the pixel array portion 201. In FIG. 4, the column output line 23 is connected to a first sample-hold circuit 42, and a second sample-hold circuit 43. The first sample-hold circuit 42 and second sample-hold circuit 43 each hold the potential of the column output line 23 at a predetermined time, the operations being controlled by a plurality of control signals (not illustrated) supplied by the control unit 203. Also, these sample-hold circuits can each supply the held potential to a voltage-current conversion circuit 44. The first sample-hold circuit 42 holds a later-described N signal. The second sample-hold circuit 43 holds a later-described A signal and A+B signal.

The voltage-current conversion circuit 44 has a function of switching, by a control signal (not illustrated) supplied by the control unit 203, the current signal based on a potential difference between the first sample-hold circuit 42 and the second sample-hold circuit 43 and outputting the resultant current signal to an AD converter 45.

The AD converter 45 is an AD converter that converts an output current signal of the voltage-current conversion cir-cuit 44 to a digital signal. The AD converter 45 may also be connected to a voltage-current conversion circuit of another column circuit, and perform AD conversion on a signal output therefrom. The AD converter 45 is a delta-sigma ($\Delta\Sigma$) type AD conversion circuit, for example, but there is no limitation to this.

Figure 5:
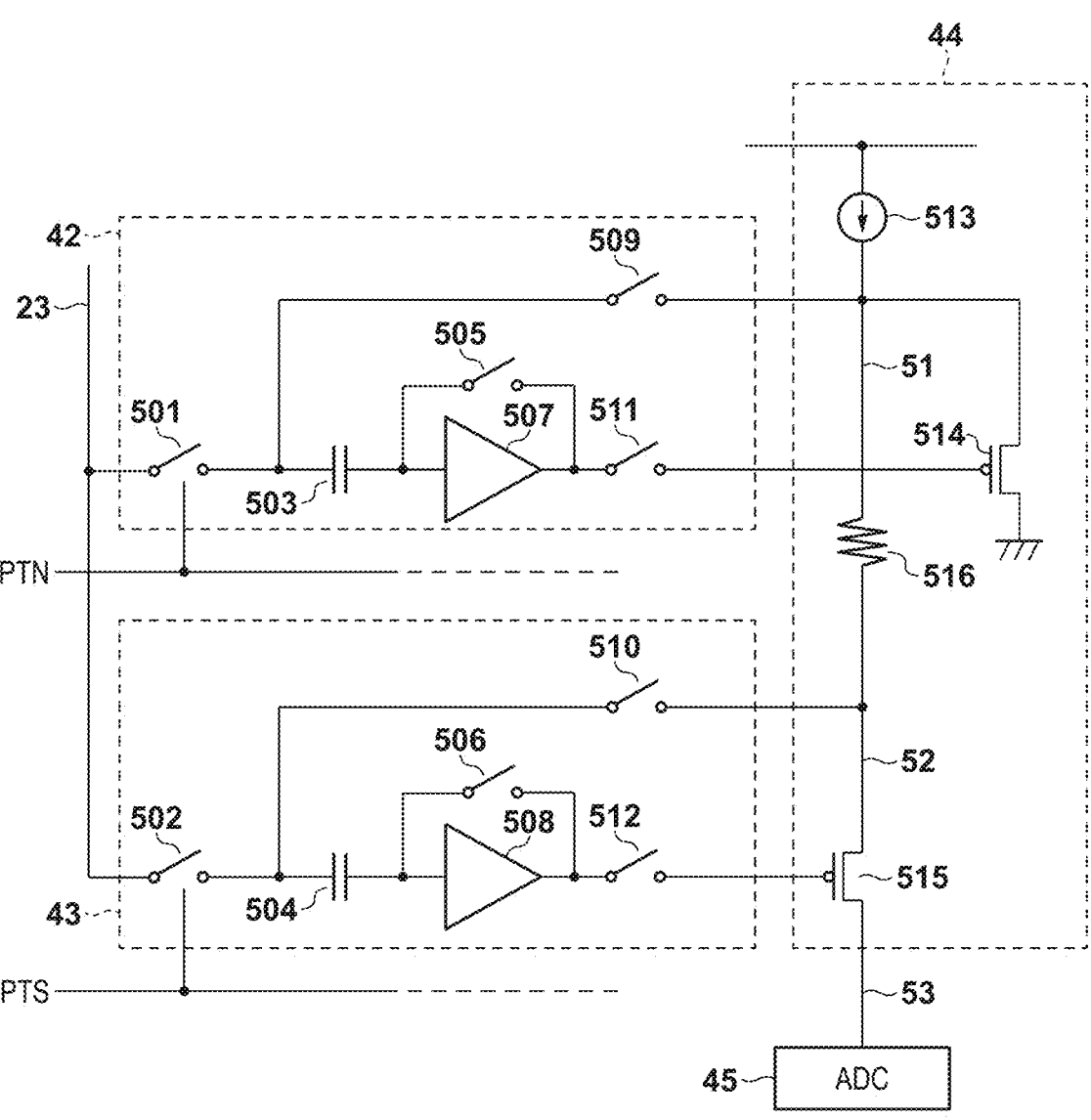
FIG. 5 is a diagram illustrating an exemplary configuration of the column circuit.

FIG. 5 is a circuit diagram illustrating an exemplary configuration of the column circuit 41. The first sample-hold circuit 42 and second sample-hold circuit 43 are connected to the column output line 23 via a switch 501 and a switch 502, respectively. The switch 501 and switch 502 are con-trolled by control signals PTN and PTS from the control unit 203, and are for selecting which of the sample-hold circuit is to hold the potential of the column output line 23.

The first sample-hold circuit 42 and second sample-hold circuit 43 respectively include a capacitor 503 and a capaci-tor 504 for holding a signal. One ends of these capacitors are respectively connected to the switch 501 and switch 502, and the other ends thereof are respectively connected to an inverting amplifier 507 and an inverting amplifier 508.

A switch 505 and a switch 506 are respectively connected between input nodes and output nodes of the respective inverting amplifier 507 and inverting amplifier 508. A switch 509 and a switch 510 are respectively provided between nodes of the switch 501 and switch 502 on a side opposite to the column output line 23 and the voltage-current con-version circuit 44. The switch 509 is connected to an interconnect 51, and the switch 510 is connected to an interconnect 52. A switch 511 and a switch 512 are respec-tively provided between the output nodes or the inverting amplifier 507 and inverting amplifier 508 and the voltage-current conversion circuit 44. The switch 511 is connected to a PMOS transistor 514, and the switch 512 is connected to a PMOS transistor 515.

The voltage-current conversion circuit 44 includes a cur-rent source 513, a resistor 516, the PMOS transistor 514, the PMOS transistor 515, the interconnect 51, the interconnect 52, and an interconnect 53. The current source 513 is arranged between a power supply voltage node and the interconnect 51, and the resistor 516 is arranged between the interconnect 51 and the interconnect 52. The PMOS tran-sistor 514 that functions as a source follower is arranged between the interconnect 51 and ground, and the PMOS transistor 515 that functions as a source follower is arranged between the interconnect 52 and the interconnect 53. The voltage-current conversion circuit 44 performs processing for converting the potential difference between the intercon-nect 51 and interconnect 52 to a current signal, and transfers the current signal to the AD converter 45.

FIG. 6 is a timing chart illustrating an example of a pixel signal read-out operation in a path from the pixel 21 to the AD converter 45. In FIG. 6, the control signals PSEL, PRES, PTXA, and PTXB that are output from the vertical scanning unit 202 to pixels 21 on one row, and the control signals PTN and PTS that are output from the control unit 203 to the column circuit 41 are shown. Also, an output potential Vout that is output from the pixel 21 to the column output line 23 of the corresponding column is shown.

In a period prior to time T1, the control signals PSEL, PRES, PTXA, PTXB, PTN, and PTS are assumed to be at a Low level (hereinafter, denoted as a "L level"). Also, charges corresponding to an incident light amount are assumed to be accumulated in the first photoelectric conversion portion 301 and the second photoelectric conversion portion 302. Also, it is assumed that the switch 505 and switch 506 in the column circuit 41 are in a closed state, and the other switches in the column circuit 41 are in an open state.

At time T1, the vertical scanning unit 202 controls the control signal PSEL to transition from a L level to a High level (hereinafter, denoted as a "H level"). Accordingly, the selection transistor 34 is turned on, and the source of the amplification transistor 33 is connected to the column output line 23 via the selection transistor 34. Here, the number of pixels connected to the column output line 23 is not limited to one, and a plurality of pixels on a different column or row on which the same operation is to be performed may be connected at the same time.

In a next predetermined period from time T2, the vertical scanning unit 202 controls the control signal PRES to transition from a L level to a H level. Accordingly, the reset transistor 32 is turned on, and the floating diffusion portion 31 is reset to a predetermined potential (reset potential) according to a reference potential. This state is the reset state of the pixel 21. With this, the output potential Vout of the column output line 23 becomes a potential according to the reset potential of the floating diffusion portion 31. This potential becomes held, during a period after the reset transistor 32 is turned off and the potential of the column output line 23 stabilizes until time T3, in the capacitor 503 and capacitor 504 as a reset signal (also denoted as an "N signal") as a result of the switch 501 and switch 502 being turned on and off by the control signals PTN and PTS. The period from time T2 to time T3 includes a stabilizing time of the column output line 23 and a write time of the N signal to the capacitor 503 and capacitor 504, and is denoted as an "N signal sample-hold period".

In a next predetermined period from time T3, the vertical scanning unit 202 controls the control signal PTXA to transition from a L level to a H level. Accordingly, the first transfer transistor 303 is turned on, and the charges accumulated in the first photoelectric conversion portion 301 are transferred to the floating diffusion portion 31, and the potential of the floating diffusion portion 31 becomes a potential according to the amount of charges transferred from the photoelectric conversion portion.

Accordingly, the output potential Vout of the column output line 23 becomes a potential according to the amount of charges transferred to the floating diffusion portion 31. This potential becomes held, during a period after the first transfer transistor 303 is turned off and the potential of the column output line 23 stabilizes until time T4 in the capacitor 504 as a photodetection signal for focus detection (also denoted as an "A signal") as a result of the switch 502 being turned on and off by the control signal PTS. The period from time T3 to time T4 includes a stabilizing time of the column output line 23 and a write time of the A signal to the capacitor 504, and is denoted as an "A signal sample-hold period".

In a next predetermined period from time T4, the switch 505 and switch 506 are turned off, and the switch 509, switch 511, switch 510, and switch 512 are turned on by control signals (not illustrated) output from the control unit 203. Here, the potential of the interconnect 51 becomes a potential based on the N signal held in the capacitor 503, and the potential of the interconnect 52 becomes a potential based on the A signal held in the capacitor 504. A current according to the potential difference between the interconnect 51 and the interconnect 52 flows through the resistor 516, and a current signal subjected to correction processing by correlated double sampling based on the N signal and A signal is taken out to the interconnect 53 connected to the AD converter 45.

The current signal of the interconnect 53 is input to the AD converter 45, converted to a digital signal, and the converted digital signal is stored in the digital memory unit 211. The period from time T4 until this converted digital signal is obtained is denoted as an "A signal AD conversion period".

In a next predetermined period from time T5, the vertical scanning unit 202 controls the control signal PTXA to transition from a L level to a H level. Also, the vertical scanning unit 202 controls the control signal PTXB to transition from a L level to a H level such that the control signal PTXB is at a H level in at least a portion of the H level period of the control signal PTXA. Accordingly, the first transfer transistor 303 and second transfer transistor 304 are turned on, and the charges accumulated in the first photoelectric conversion portion 301 and second photoelectric conversion portion 302 are transferred to the floating diffusion portion 31 at the same time. Then, the potential of the floating diffusion portion 31 becomes a potential according to the amount of charges transferred from the two photoelectric conversion portions.

Accordingly, the output potential Vout of the column output line 23 becomes a potential according to the charges transferred to the floating diffusion portion 31. This potential becomes held in the capacitor 504 as a photodetection signal (also denoted as an "A+B signal") for image forming, in a period after the first transfer transistor 303 and second transfer transistor 304 are turned off and the potential of the column output line 23 stabilizes until time T6, due to the switch 502 being turned on and off by the control signal PTS. The period from time T5 to time T6 includes a stabilizing time of the column output line 23 and a write time of the A+B signal to the capacitor 504, and is denoted as an "A+B signal sample-hold period".

In a next predetermined period from time T6, the switch 505 and switch 506 are turned off, and the switch 509, switch 511, switch 510, and switch 512 are turned on by control signals (not illustrated) output from the control unit 203. Here, the potential of the interconnect 51 becomes a potential based on the N signal held in the capacitor 503, and the potential of the interconnect 52 becomes a potential based on the A+B signal held in the capacitor 504. A current according to the potential difference between the interconnect 51 and the interconnect 52 flows through the resistor 516, and a current signal subjected to correction processing by correlated double sampling based on the N signal and A+B signal is taken out to the interconnect 53 connected to the AD converter 45.

The current signal of the interconnect 53 is input to the AD converter 45, converted to a digital signal, and the converted digital signal is stored in the digital memory unit 211. The period from time T6 until this converted digital signal is obtained is denoted as an "A+B signal AD conversion period".

At time T7 next, the vertical scanning unit 202 controls the control signal PSEL to transition from a H level to a L level. With this, the selection transistor 34 is turned off, and the source of the amplification transistor 33 is cut off from the column output line 23. When the operation at time T7 and the A+B signal AD conversion period are ended, the operation for reading out signals of the pixels 21 belonging to the one row to the corresponding AD converters 45 via the respective column output lines 23 is ended.

The control circuit 112 obtains a B signal by subtracting the A signal from the read-out A+B signal, and executes a focus detection computation in the horizontal direction using the A signal and B signal. The image processing circuit 109 generates image data by performing predetermined signal processing on the A+B signal.

In order to hold a photodetection signal (A signal) for focus detection in addition to the photodetection signal (A+B signal) for image forming, in general, a third sample-hold circuit for the A signal is needed in addition to the first sample-hold circuit 42 for the N signal and the second sample-hold circuit 43 for the A+B signal.

In the first embodiment, after performing AD conversion of the A signal using the first sample-hold circuit 42 and second sample-hold circuit 43, AD conversion is sequentially performed on a signal obtained by adding the B signal to the second sample-hold circuit 43. Therefore, a third sample-hold circuit is not needed. Here, the A signal and A+B signal are AD converted based on a shared N signal.

Note that, in the present embodiment, an example has been described in which the A signal and B signal are input to the sample-hold circuit via the same floating diffusion portion 31 and column output line 23, but there is no limitation to this. For example, a configuration may be adopted in which the A signal and B signal are input to the sample-hold circuit via different floating diffusion portions 31 and column output lines 23.

With this configuration, an image capturing apparatus in which signals of a plurality of photoelectric conversion elements can be read out while suppressing the increase in the area of the sample-hold circuits can be provided.

Second Embodiment

In the first embodiment described above, a configuration has been described in which signals of two photoelectric conversion elements provided in each pixel are read out by two sample-hold circuits. In the second embodiment, a configuration will be described in which signals of four photoelectric conversion elements provided in each pixel are read out by two sample-hold circuits.

It is known that, when the number of photoelectric conversion elements included in one pixel is increased, focus detection can be executed with higher accuracy. In the second embodiment, an example is illustrated in which three types of photodetection signals are read out from the pixel portion in addition to the reset signal.

Figure 7:
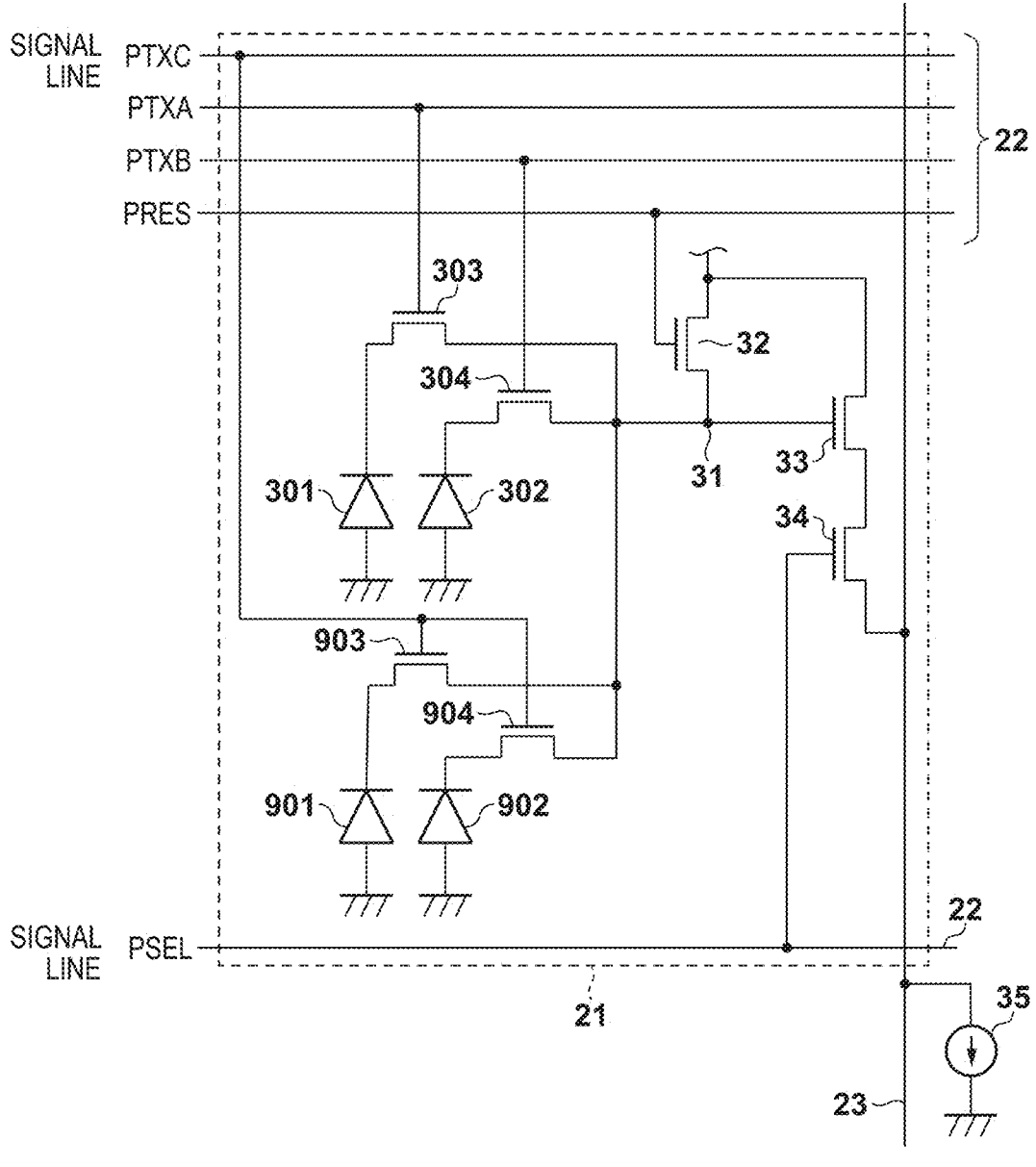
FIG. 7 is an equivalent circuit diagram of a unit pixel of a second embodiment.
Figure 8:
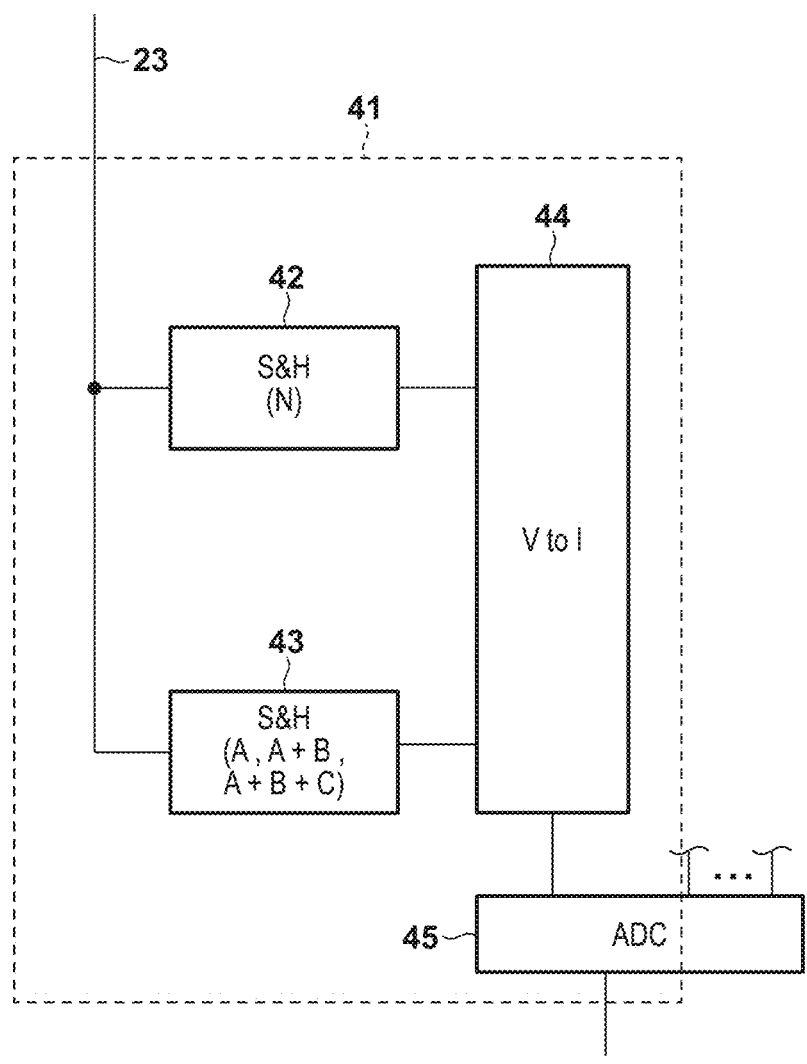
FIG. 8 is a simplified block diagram of a column circuit of the second embodiment.
Figure 9:
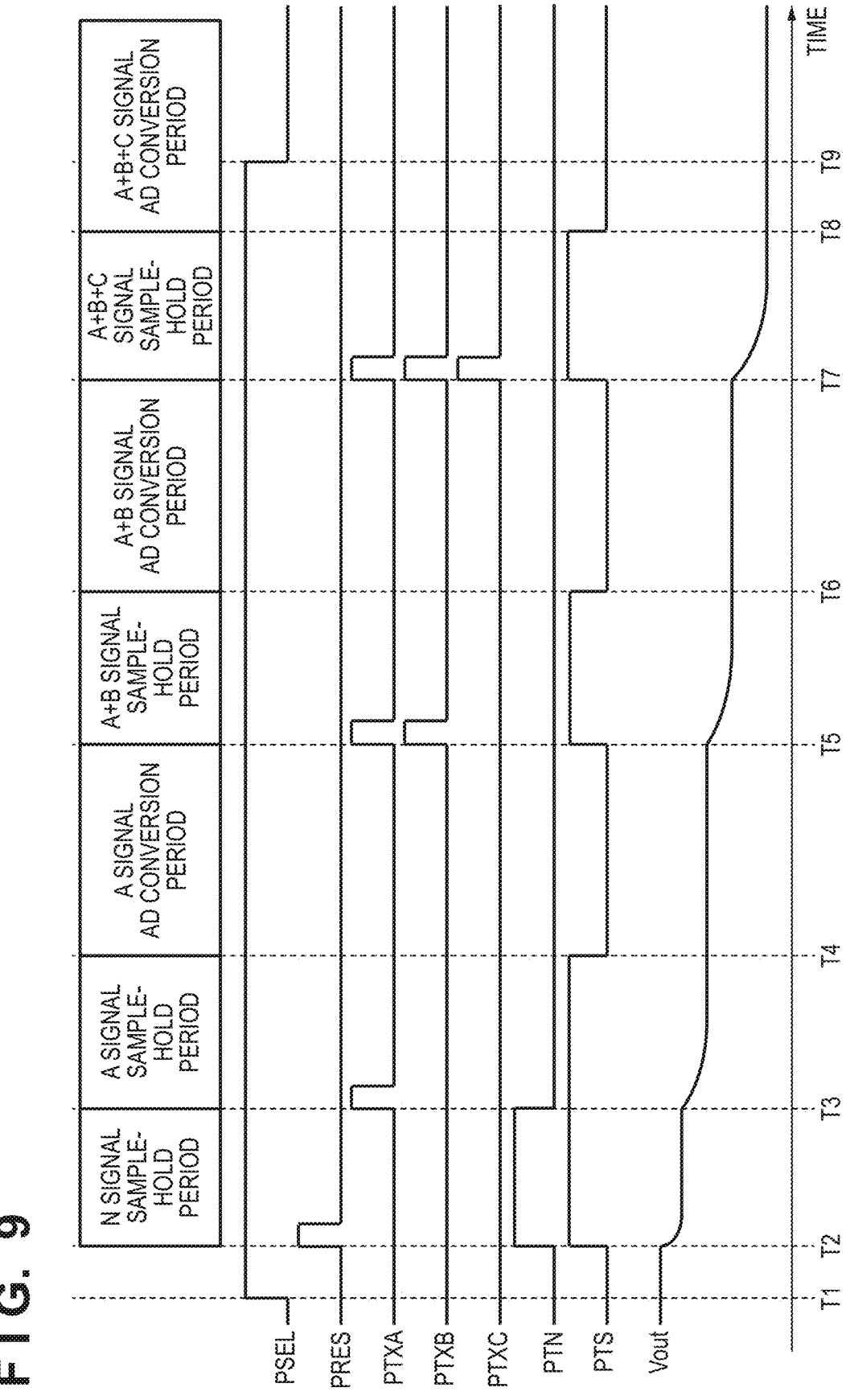
FIG. 9 is a timing chart of the second embodiment.

The second embodiment of the present invention will be described using FIGS. 7 to 9. In FIGS. 7 to 9, the constituent elements similar to those of the first embodiment will be given the same reference numerals, and the description thereof will be omitted or simplified.

FIG. 7 is an example of the equivalent circuit diagram of a unit pixel in the second embodiment. A third photoelectric conversion portion 901, a fourth photoelectric conversion portion 902, a third transfer transistor 903, and a fourth transfer transistor 904 are added to the arrangement of the pixel configuration of the first embodiment. Also, a signal line for supplying a control signal PTXC, which is a control signal line 22 connected to the vertical scanning unit 202, is included.

As a result of increasing the number of photoelectric conversion elements to four, when the photoelectric conversion elements are arranged in a 2×2 matrix, for example, signals for focus detection corresponding to the horizontal direction and the vertical direction can be obtained. The third transfer transistor 903 is arranged between the third photoelectric conversion portion 901 and the floating diffusion portion 31, and the fourth transfer transistor 904 is arranged between the fourth photoelectric conversion portion 902 and the floating diffusion portion 31. The gates of the third transfer transistor 903 and fourth transfer transistor 904 are connected to the signal line PTXC, and when the control signal is at a H level, the signals of the corresponding photoelectric conversion elements are transferred to the floating diffusion portion 31.

FIG. 8 is a simplified block diagram of the column circuit in the second embodiment. The basic configuration is the same as FIG. 4 described in the first embodiment, but the second sample-hold circuit 43 can hold a later-described A+B+C signal in addition to the A signal and A+B signal.

FIG. 9 is a timing chart illustrating an example of a pixel signal read-out operation in a path from the pixel 21 to the AD converter 45, in the second embodiment. The operations prior to time T1 and from time T1 to time T6 are the same as those of the first embodiment, and therefore the description thereof will be omitted.

The point that differs from the first embodiment in a period until time T6 is that the A+B signal is not a photodetection signal for image forming, and instead is a photodetection signal for focus detection.

In a predetermined period from time T7, the vertical scanning unit 202 controls the control signals PTXA and PTXB to transition from a L level to a H level. The vertical scanning unit 202 controls the control signal PTXC to transition from a L level to a H level such that the control signal PTXC is at a H level in at least a portion of the H level period of the control signals PTXA and PTXB. With this, all of the transfer transistors from the first transfer transistor 303 to the fourth transfer transistor 904 are turned on, and the charges accumulated in the photoelectric conversion portions from the first photoelectric conversion portion 301 to the fourth photoelectric conversion portion 902 are transferred to the floating diffusion portion 31 at the same time. Then, the potential of the floating diffusion portion 31 becomes a potential according to the amount of charges transferred from the four photoelectric conversion portions.

Accordingly, the output potential Vout of the column output line 23 becomes a potential according to the charges transferred to the floating diffusion portion 31. This potential becomes held in the capacitor 504 as a third photodetection signal (also denoted as an "A+B+C signal") for image forming, in a period after the transfer transistors from the first transfer transistor 303 to fourth transfer transistor 904 are turned off and the potential of the column output line 23 stabilizes until time T8, due to the switch 502 being turned on and off by the control signal PTS. The period from time T7 to time T8 includes a stabilizing time of the column output line 23 and a write time of the A+B+C signal to the capacitor 504, and is denoted as an "A+B+C signal sample-hold period".

In a next predetermined period from time T8, the switch 505 and switch 506 are turned off, and the switch 509, switch 511, switch 510, and switch 512 are turned on by control signals (not illustrated) output from the control unit 203. Here, the potential of the interconnect 51 becomes a potential based on the N signal held in the capacitor 503, and the potential of the interconnect 52 becomes a potential based on the A+B+C signal held in the capacitor 504. A current according to the potential difference between the interconnect 51 and the interconnect 52 flows through the resistor 516, and a current signal subjected to correction processing by correlated double sampling based on the N signal and A+B+C signal is taken out to the interconnect 53 connected to the AD converter 45.

The current signal of the interconnect 53 is input to the AD converter 45, converted to a digital signal, and the converted digital signal is stored in the digital memory unit 211. The period from time T8 until this converted digital signal is obtained is denoted as an "A+B+C signal AD conversion period".

At time T9 next, the vertical scanning unit 202 controls the control signal PSEL to transition from a H level to a L level. With this, the selection transistor 34 is turned off, and the source of the amplification transistor 33 is cut off from the column output line 23. When the operation at time T9 and the A+B+C signal AD conversion period are ended, the read-out operation until the signals of the pixels 21 belonging to the one row are AD-converted is ended.

The control circuit 112 obtains the B signal by subtracting the A signal from the read-out A+B signal, and executes focus detection computation in the horizontal direction using the A signal and B signal. Also, the control circuit 112 obtains the C signal by subtracting the A+B signal from the A+B+C signal, and executes focus detection computation in the vertical direction using the A+B signal and C signal. The image processing circuit 109 performs predetermined signal processing on the A+B+C signal, and generates image data.

In order to hold a plurality of photodetection signals (A signal, A+B signal) for focus detection in addition to the third photodetection signal (A+B+C signal) for image forming, in general, a third sample-hold circuit for the A signal and a fourth sample-hold circuit for the A+B signal are needed in addition to the first sample-hold circuit 42 for the N signal and the second sample-hold circuit 43 for the A+B+C signal. In the second embodiment, after the AD conversion of the A signal is performed using the first sample-hold circuit 42 and second sample-hold circuit 43, the B signal and the B+C signal are added to the second sample-hold circuit 43 to sequentially perform AD conversion. Therefore, the third and fourth sample-hold circuits need not be added. Note that the A signal, A+B signal, and A+B+C signal are AD converted based on the shared N signal.

With the configuration described above, an image capturing apparatus can be provided in which signals of a plurality of photoelectric conversion elements can be read out, while suppressing the increase in the area of the sample-hold circuits.

Third Embodiment

In a third embodiment, an example will be described in which the read-out time is reduced with respect to a configuration in which signals of two photoelectric conversion elements are read out using two sample-hold circuit. The configurations of the unit pixel and the column circuit are similar to those of the first embodiment, and therefore the description thereof will be omitted.

Figure 10:
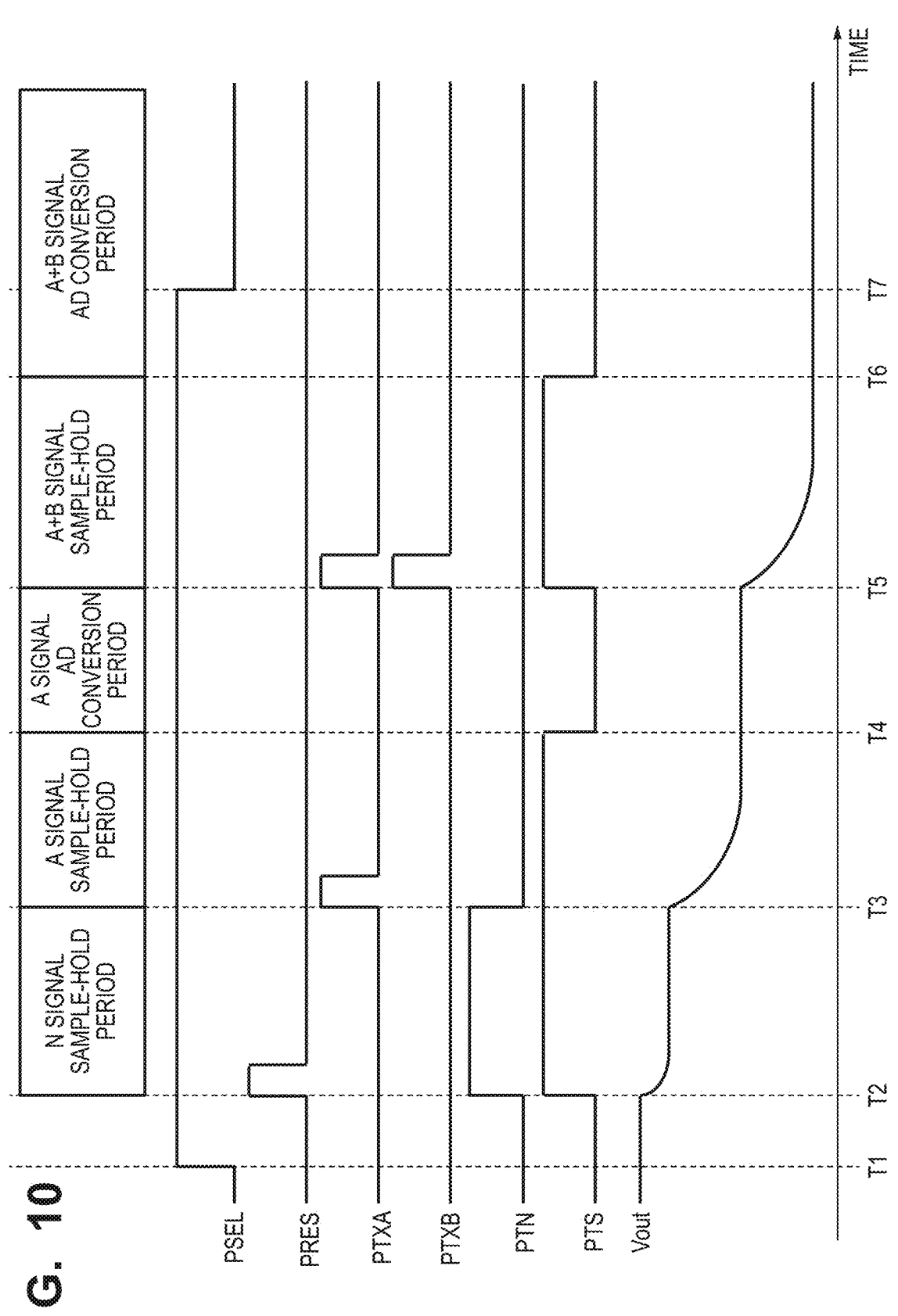
FIG. 10 is a timing chart of a third embodiment.

FIG. 10 is a timing chart illustrating an example of a pixel signal read-out operation in a path from the pixel 21 to the AD converter 45, in the third embodiment. The basic operations prior to time T1 and from time T1 to time T7 are the same as those of the first embodiment, and therefore the description thereof will be omitted.

The point that differs from the first embodiment is that the "A signal sample-hold period" and "A signal AD conversion period" are respectively shorter than the "A+B signal sample-hold period" and "A+B signal AD conversion period".

In FIG. 10, the "A signal sample-hold period" from time T3 to time T4 is shorter than the "A+B signal sample-hold period" from time T5 to time T6. Also, the "A signal AD conversion period" from time T4 to time T5 is shorter than the "A+B signal AD conversion period" after time T6.

Here, reduction of the sample-hold period, that is, the stabilizing time of potential, may possibly degrade offset variation and dark shading when the image sensor is in darkness. Also, reduction of the AD conversion period may possibly degrade resolution and dynamic range of the pixel signal.

However, in a focus detection application, the requirement regarding the dark time characteristics, resolution, and dynamic range of the pixel signal is not severe relative to that in an image forming application. Therefore, the read-out time can be reduced by reducing the sample-hold period and AD conversion period of the A signal.

Note that, in the present embodiment, an example has been illustrated in which both of the sample-hold period and AD conversion period of the A signal are reduced relative to those of the A+B signal, but only one of the sample-hold period and AD conversion period may be reduced. Which of the configurations is adopted is determined, as appropriate, according to the characteristic of potential stabilization in the image sensor, the accuracy required for the A signal, and needed read-out time.

With the configuration described above, an image capturing apparatus can be provided in which signals of a plurality of photoelectric conversion elements are read out and the read-out time thereof is reduced, while suppressing the increase in the area of the sample-hold circuits.

Fourth Embodiment

In the fourth embodiment, a configuration will be described in which a signal of an image sensor in which one pixel includes one photoelectric conversion element is read out using two sample-hold circuits. In the fourth embodiment, an example of a case where two photodetection signals are read out from the pixel portion in addition to the reset signal is illustrated.

Figure 11:
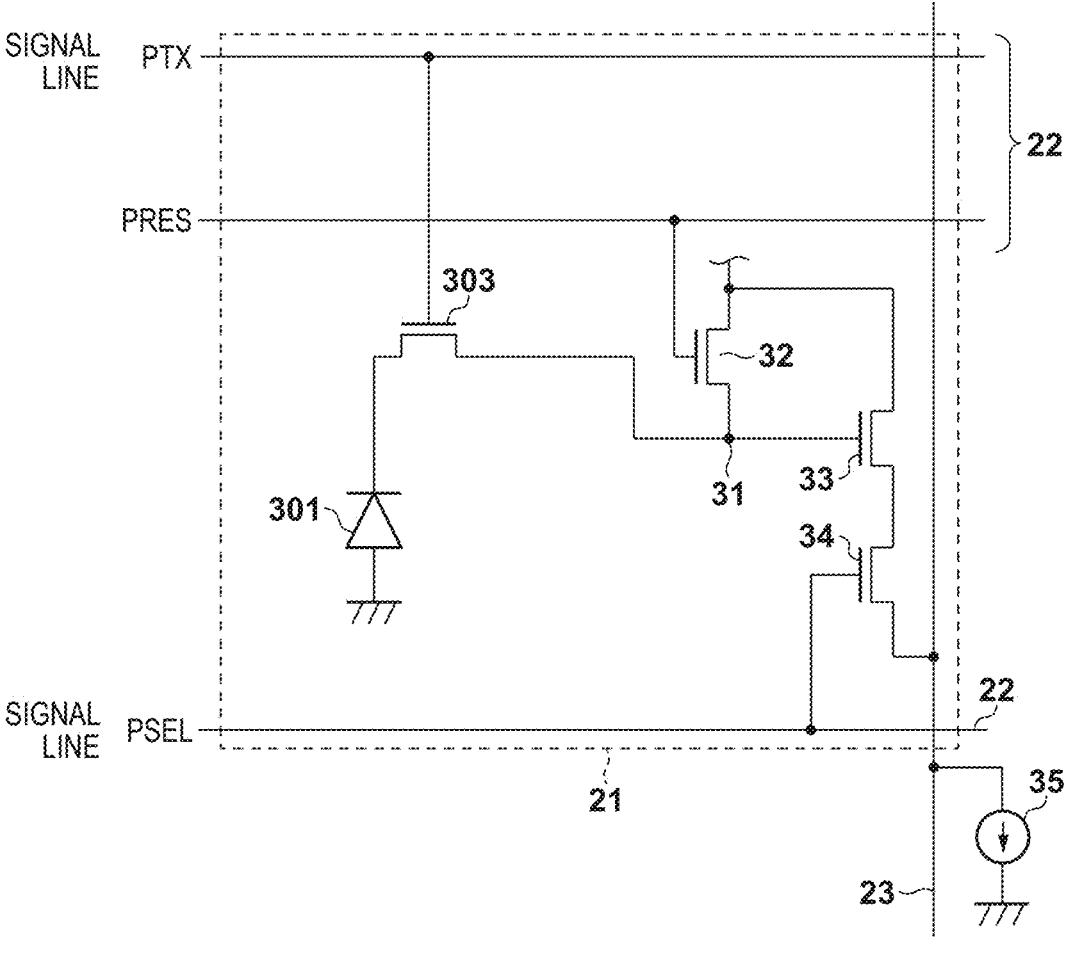
FIG. 11 is an equivalent circuit diagram of a unit pixel of a fourth embodiment.

FIG. 11 is an example of the equivalent circuit diagram of a unit pixel in the fourth embodiment.

The second photoelectric conversion portion 302 and second transfer transistor 304 are deleted from the pixel 21 in the first embodiment. Also, the control signal of the first transfer transistor 303 is denoted as PTX.

Figure 12:
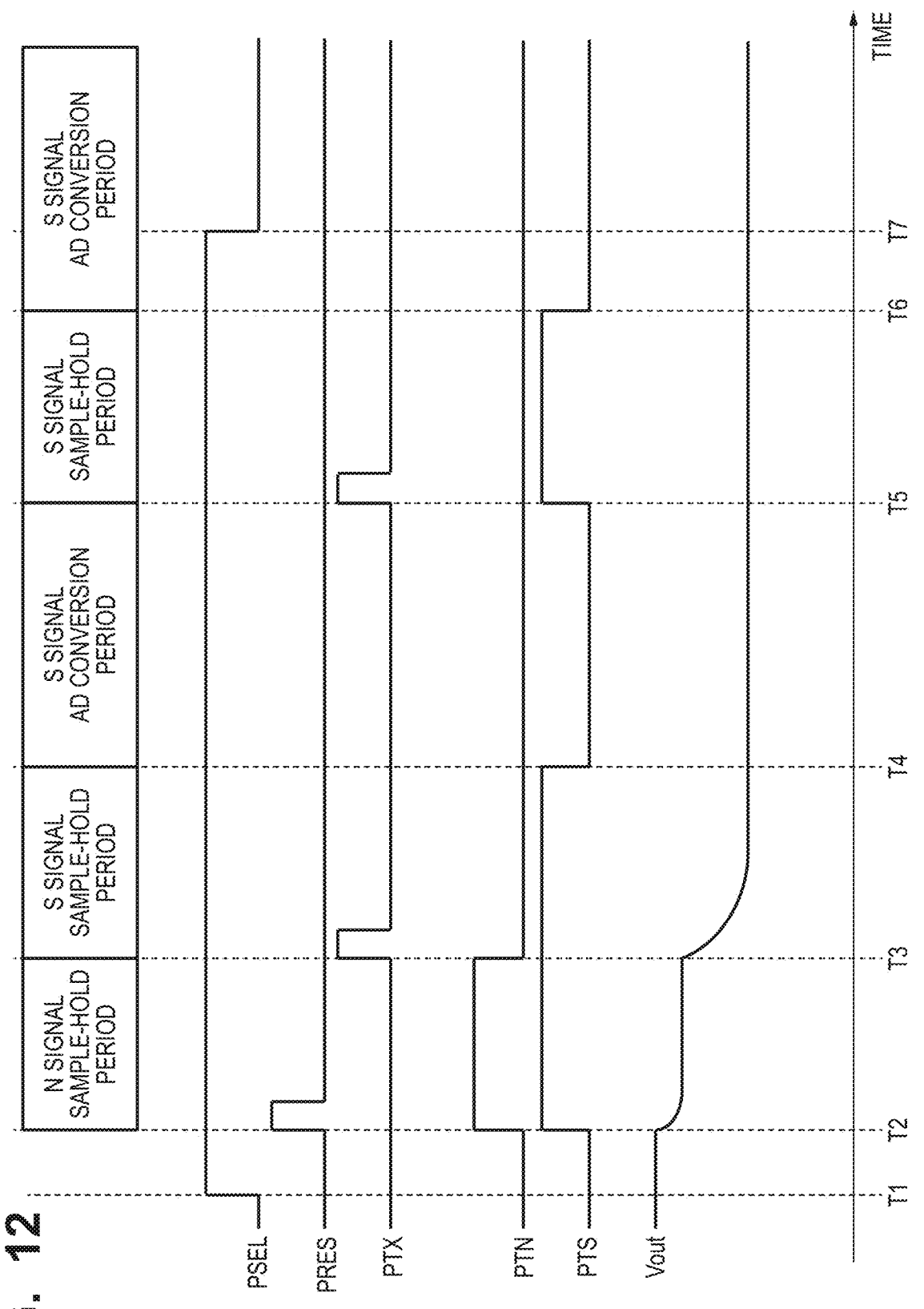
FIG. 12 is a timing chart of the fourth embodiment.

FIG. 12 is a timing chart illustrating an example of a pixel signal read-out operation in a path from the pixel 21 to the AD converter 45, in the fourth embodiment. The basic operations prior to time T1 and from time T1 to time T7 are the same as those of the first embodiment, but the control signals PTXA and PTXB are consolidated to PTX, and the photodetection signal is denoted as an "S signal".

In a predetermined period from time T3, the vertical scanning unit 202 controls the control signal PTX to transition from a L level to a H level. Accordingly, the first transfer transistor 303 is turned on, and the charges accumulated in the first photoelectric conversion portion 301 are transferred to the floating diffusion portion 31. Then, the potential of the floating diffusion portion 31 becomes a potential according to the amount of charges transferred from the photoelectric conversion portion.

In a predetermined period from time T4, AD conversion is performed based on the N signal and a first S signal.

In a predetermined period from time T5, the vertical scanning unit 202 again controls the control signal PTX from a L level to a H level. Accordingly, the first transfer transistor 303 is turned on, and the charges accumulated in the first photoelectric conversion portion 301 are transferred to the floating diffusion portion 31. Then, the potential of the floating diffusion portion 31 becomes a potential according to the amount of charges transferred from the photoelectric conversion portion.

In a predetermined period from time T6, AD conversion is performed based on the N signal and a second S signal.

The image processing circuit 109 generates image data by performing predetermined signal processing such as averaging on the plurality of S signals read out from the same pixel, as described above.

In order to hold a plurality of photodetection signals (S signals), in general, a third sample-hold circuit is needed in addition to the first sample-hold circuit 42 and second sample-hold circuit 43.

In the fourth embodiment, after performing AD conversion of the first S signal using the first sample-hold circuit 42 and second sample-hold circuit 43, the second S signal is sequentially AD converted using the second sample-hold circuit 43. Therefore, the third sample-hold circuit is not needed. Here, the first S signal and second S signal are AD converted based on the shared N signal.

It is known that, as a result of reading out a signal of the same pixel a plurality of times, and performing averaging on the read-out signals, the noise of the pixel signal can be reduced. The example described in the present embodiment is used in such an application.

Also, as a modification of the present embodiment, the aforementioned second S signal from the same pixel can be replaced with an S signal from a different pixel connected to the shared column output line 23, or an S signal from a pixel connected to a column output line 23 of a different column. It is known that, as a result of reading out signals of different pixels and performing addition or averaging thereon, the number of pixels can be compressed. The example described in the present embodiment can also be used in such an application.

Fifth Embodiment

In a fifth embodiment, a configuration will be described in which signals of two photoelectric conversion elements are read out using different column output lines and column circuit units (sample-hold circuits) of the same column.

FIG. 13 is a simplified configuration diagram of an image sensor 102 in the fifth embodiment. In FIG. 13, the pixel array portion 201 and column circuit unit 210 in FIG. 2 are focused on, and one certain column (first column) is extracted and shown.

The image sensor 102 includes a plurality of column output lines for each column, and two column output lines, namely a column output line 23_1 and column output line 23_2, are illustrated as an example. The pixels from a pixel 21_1 to a pixel 21_n (n is a positive integer) may each be connected to the column output line 23_1 and column output line 23_2 by a corresponding selection transistor, which is not illustrated. In the present embodiment, it is assumed that the pixel signal is selectively read out by the column output line 23_1 and column output line 23_2. Connection to the column output line 23_1 and column output line 23_2 is controlled by the vertical scanning unit 202. As a result of including a plurality of column output lines for one column in this way, signals of a plurality of rows can be read out in parallel simultaneously (two rows each in this example), and therefore the signal read-out speed can be increased.

Also, the image sensor 102 includes a column circuit 41_1 and a column circuit 41_2 that are respectively provided in correspondence with the column output line 23_1 and column output line 23_2. The control signals PTN and PTS for controlling the switch 501 and switch 502 that connect between the column output line 23 and the first sample-hold circuit 42 and second sample-hold circuit 43 are provided in correspondence with each column circuit (refer to FIGS. 14 and 15). In the present embodiment, control signals PTN1 and PTS1 in correspondence with the column circuit 41_1 and control signals PTN2 and PTS2 in correspondence with the column circuit 41_2 are shown.

A switch 601 is a switch for connecting between the column output line 23_1 and column output line 23_2, and a signal of one column output line can be transmitted to the other column circuit. The switch 601 is controlled by a control signal PSHT.

FIG. 14 is a simplified block diagram of the column circuit in the fifth embodiment. The column output line 23_1 is connected to a first sample-hold circuit 42_1 and a second sample-hold circuit 43_1 of the column circuit 41_1. The column output line 23_2 is connected to a first sample-hold circuit 42_2 and a second sample-hold circuit 43_2 of the column circuit 41_2.

The first sample-hold circuits 42_1 and 42_2 may hold the N signal, the second sample-hold circuit 43_1 may hold the A signal, and the second sample-hold circuit 43_2 may hold the A+B signal. Description of this will be given using the later-described timing chart.

A voltage-current conversion circuit 44_1 and a voltage-current conversion circuit 44_2 are respectively arranged in correspondence with the column circuit 41_1 and column circuit 41_2.

The AD converter 45 is arranged so as to be shared between the voltage-current conversion circuit 44_1 and voltage-current conversion circuit 44_2.

Figure 15:
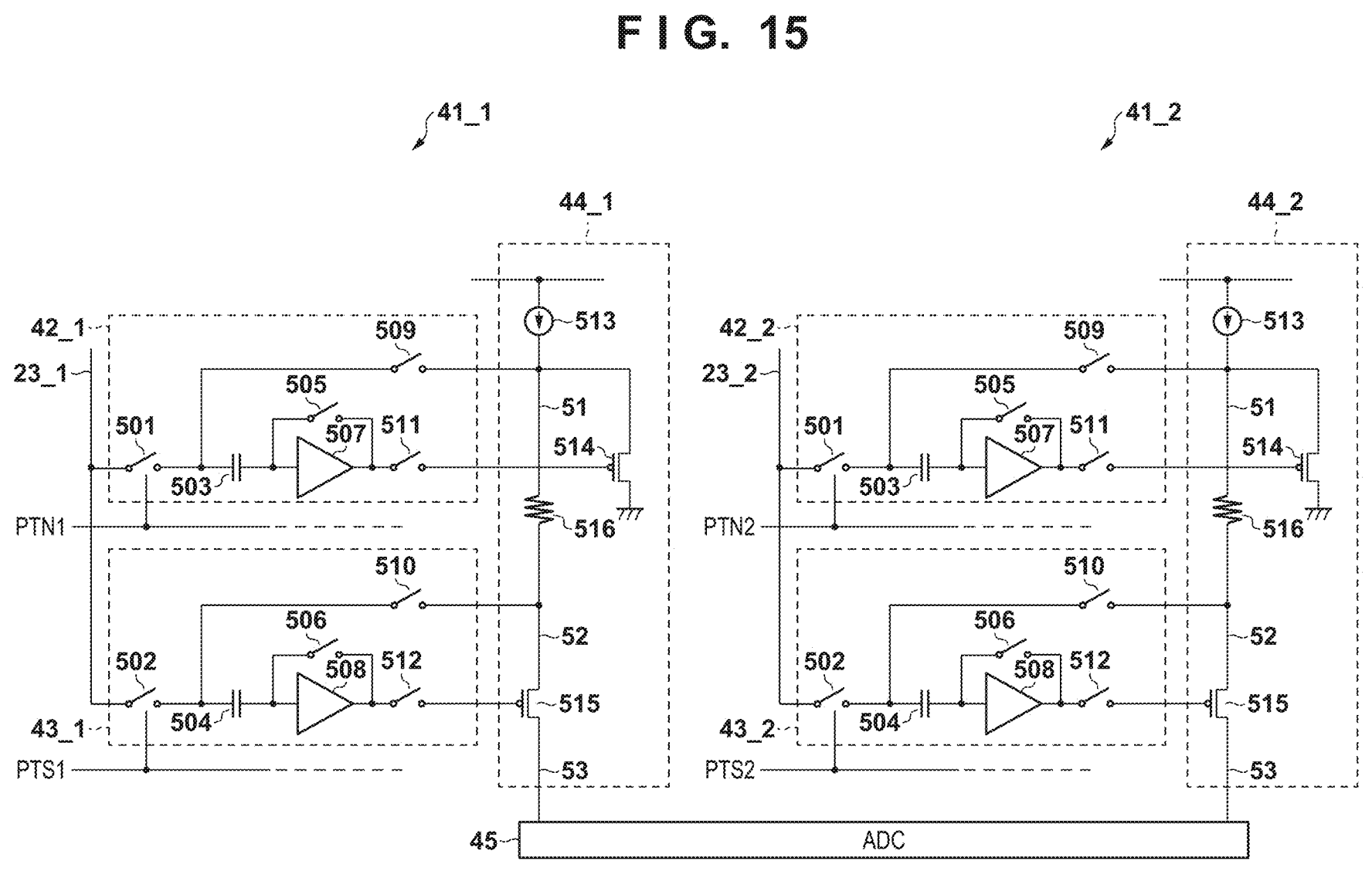

FIG. 15 is a circuit diagram illustrating an exemplary configuration of the column circuit in the fifth embodiment. The point that differs from FIG. 5 is that the AD converter 45 is shared between the two column circuits, namely the column circuit 41_1 and column circuit 41_2, that are respectively in correspondence with the column output line 23_1 and column output line 23_2. Note that the configuration of the switches, capacitors, amplifiers, and interconnects are similar to that of the circuit diagram shown in FIG. 5, and therefore the detailed description thereof will be omitted.

The first sample-hold circuit 42_1 and second sample-hold circuit 43_1 of the column circuit 41_1 are respectively connected to the column output line 23_1 via the switch 501 and switch 502 of the column circuit 41_1, which are respectively controlled by the control signals PTN1 and PTS1.

The first sample-hold circuit 42_2 and second sample-hold circuit 43_2 of the column circuit 41_2 are respectively connected to the column output line 23_2 via the switch 501 and switch 502 of the column circuit 41_2, which are respectively controlled by the control signals PTN2 and PTS2.

Current signals based on the potential difference between the potential of the interconnect 51 and the potential of the interconnect 52, which are obtained by conversion performed by the voltage-current conversion circuit 44_1 and voltage-current conversion circuit 44_2 are transferred to the AD converter 45.

Figure 16:
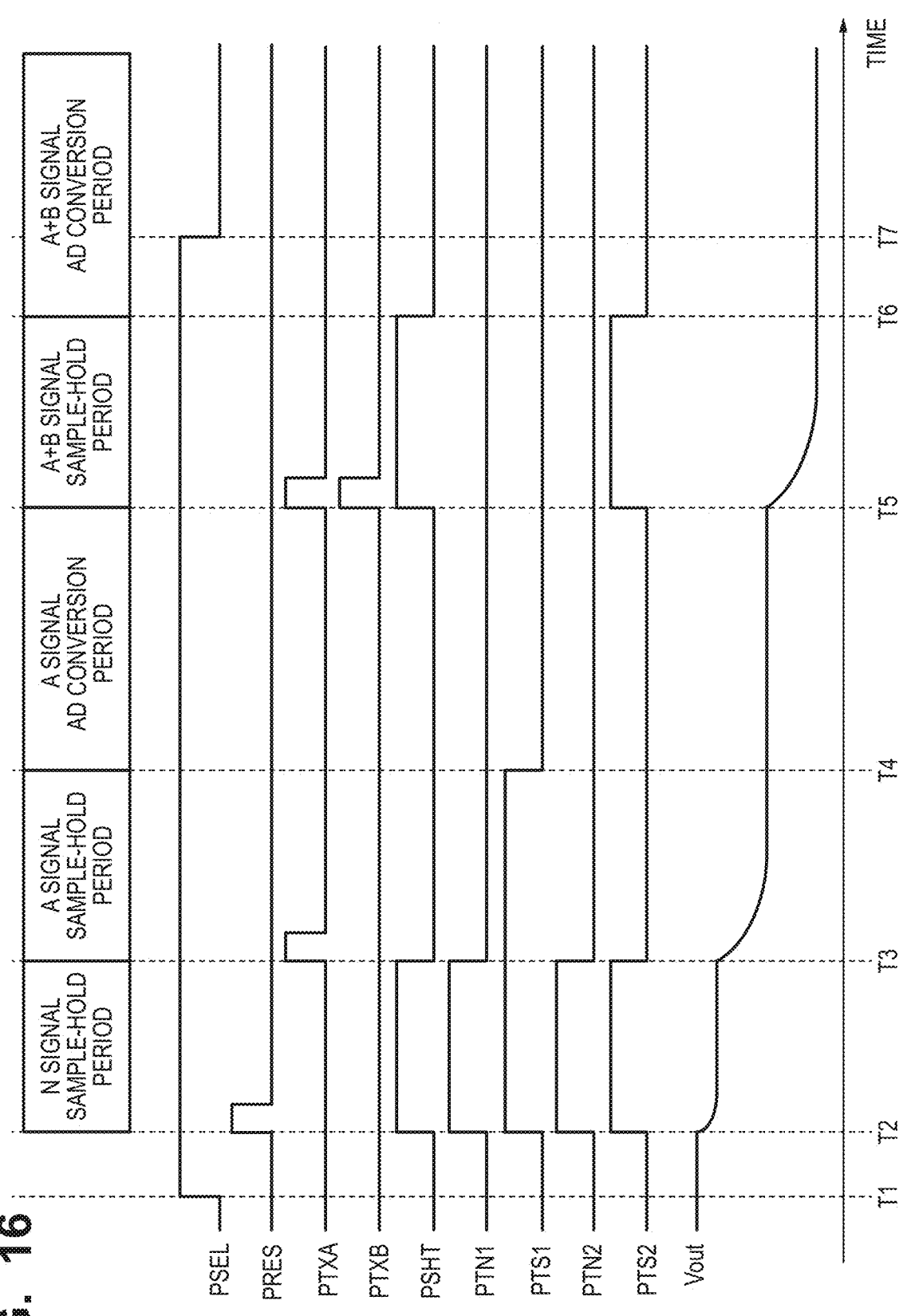
FIG. 16 is a timing chart of the fifth embodiment.

FIG. 16 is a timing chart illustrating an example of a pixel signal read-out operation in a path from a pixel to a column circuit unit, in the fifth embodiment. The basic operations are the same as the first embodiment, and therefore description will be given focusing on the differences.

At time T2, a reset potential is output to the column output lines 23_1 and 23_2 by the control signal PRES. This potential becomes held in the capacitors 503 and capacitors 504 of the column circuits 41_1 and 41_2 as the N signal in a period until time T3, due to the switches 501 and switches 502 being turned on and off by the control signals PTN1, PTS1, PTN2, and PTS2. Here, the switch 601 is turned on due to the control signal PSHT being activated, and therefore the column output lines 23_1 and 23_2 are short-circuited to be the same potential.

At time T3, the control signals PTN1, PTN2, PTS2, and PSHT are deactivated while the control signal PTS1 is kept activated. Here, the control signal PTXA is controlled to transition from a L level to a H level. With this, the first transfer transistor 303 is turned on (refer to FIG. 3), and the potential according to the amount of charges accumulated in the first photoelectric conversion portion 301 becomes held in the capacitor 504 of the column circuit 41_1 as the A signal.

At time T4, a current signal subjected to correction processing by correlated double sampling based on the N signal and and A signal of the column circuit 41_1 is input to the AD converter 45, and is converted to a digital signal.

At time T5, the control signals PTS2 and PSHT are activated while the control signals PTN1, PTS1, and PTN2 are kept deactivated. Here, the control signal PTXA is controlled to transition from a L level to a H level, and the control signal PTXB is controlled to transition from a L level to a H level such that the control signal PTXB is at a H level in at least a portion of a H level period of the control signal PTXA. Accordingly, the first transfer transistor 303 and second transfer transistor 304 are turned on, and the potential according to the amount of charges accumulated in the first photoelectric conversion portion 301 and second photoelectric conversion portion 302 becomes held in the capacitor 504 of the column circuit 41_2 as the A+B signal.

At time T6, a current signal subjected to correction processing by correlated double sampling based on the N signal and and A+B signal of the column circuit 41_2 is input to the AD converter 45, and is converted to a digital signal.

In order to hold a photodetection signal (A signal) for focus detection, in addition to a photodetection signal (A+B signal) for image forming, in general, a third sample-hold circuit for the A signal is needed in addition to the first sample-hold circuit 42 and second sample-hold circuit 43.

In the fifth embodiment, the A signal is AD converted using the first sample-hold circuit 42_1 and second sample-hold circuit 43_1 of the column circuit 41_1, and the A+B signal is AD converted using the first sample-hold circuit 42_2 and second sample-hold circuit 43_2 of the column circuit 41_2. Therefore, the photodetection signal (A signal) for focus detection can be read out, without the need of adding the third sample-hold circuit.

Note that, in the present embodiment, an example has been described in which the A signal and the A+B signal are separately handled by two column output lines and two column circuits in correspondence therewith, but the present invention is not limited thereto. The number of the column output lines and column circuits in correspondence therewith may be three or more, and the rows from which the A signal is read out in the same column may also be limited to some rows. Also, a configuration may also be adopted in which the AD converter 45 shared by the column circuit 41_1 and column circuit 41_2 is provided for each column circuit.

As described above, using an image sensor as well in which the read-out speed is increased by including a plurality of column output lines for each column, an image capturing apparatus can be provided in which signals of a plurality of photoelectric conversion elements can be read out while suppressing the increase in the area of the sample-hold circuits.

Sixth Embodiment

In a sixth embodiment, a configuration will be described in which signals of two photoelectric conversion elements are read out using a column output line and a column circuit unit (sample-hold circuit) of a different column.

FIG. 17 is a simplified configuration diagram of an image sensor 102 in the sixth embodiment. In FIG. 17, the pixel array portion 201 and column circuit unit 210 in FIG. 2 are focused on, and two certain columns (first column and second column) of the same color are extracted and shown.

The image sensor 102 includes one column output line for each column, and a column output line 23_1 of a first column and a column output line 23_2 of a second column are shown. The pixels from a pixel 21_1 to a pixel 21_n (n is a positive integer) may be connected to the column output line 23_1 or column output line 23_2 by respective selection transistors, which are not illustrated.

Also, the image sensor 102 includes a column circuit 41_1 and a column circuit 41_2 that are respectively provided in correspondence with the column output line 23_1 and column output line 23_2. The control signals PTN and PTS for controlling the switch 501 and switch 502 that connect between the column output line 23 and the first sample-hold circuit 42 and second sample-hold circuit 43, respectively, are provided in correspondence with each column circuit (refer to FIGS. 14 and 15). In the present embodiment, control signals PTN1 and PTS1 in correspondence with the column circuit 41_1 and control signals PTN2 and PTS2 in correspondence with the column circuit 41_2 are shown.

A switch 701 is a switch for connecting between the column output line 23_1 and column output line 23_2, and a signal of one column output line can be transmitted to the other column circuit. The switch 701 is controlled by a control signal PADD.

Figure 18:
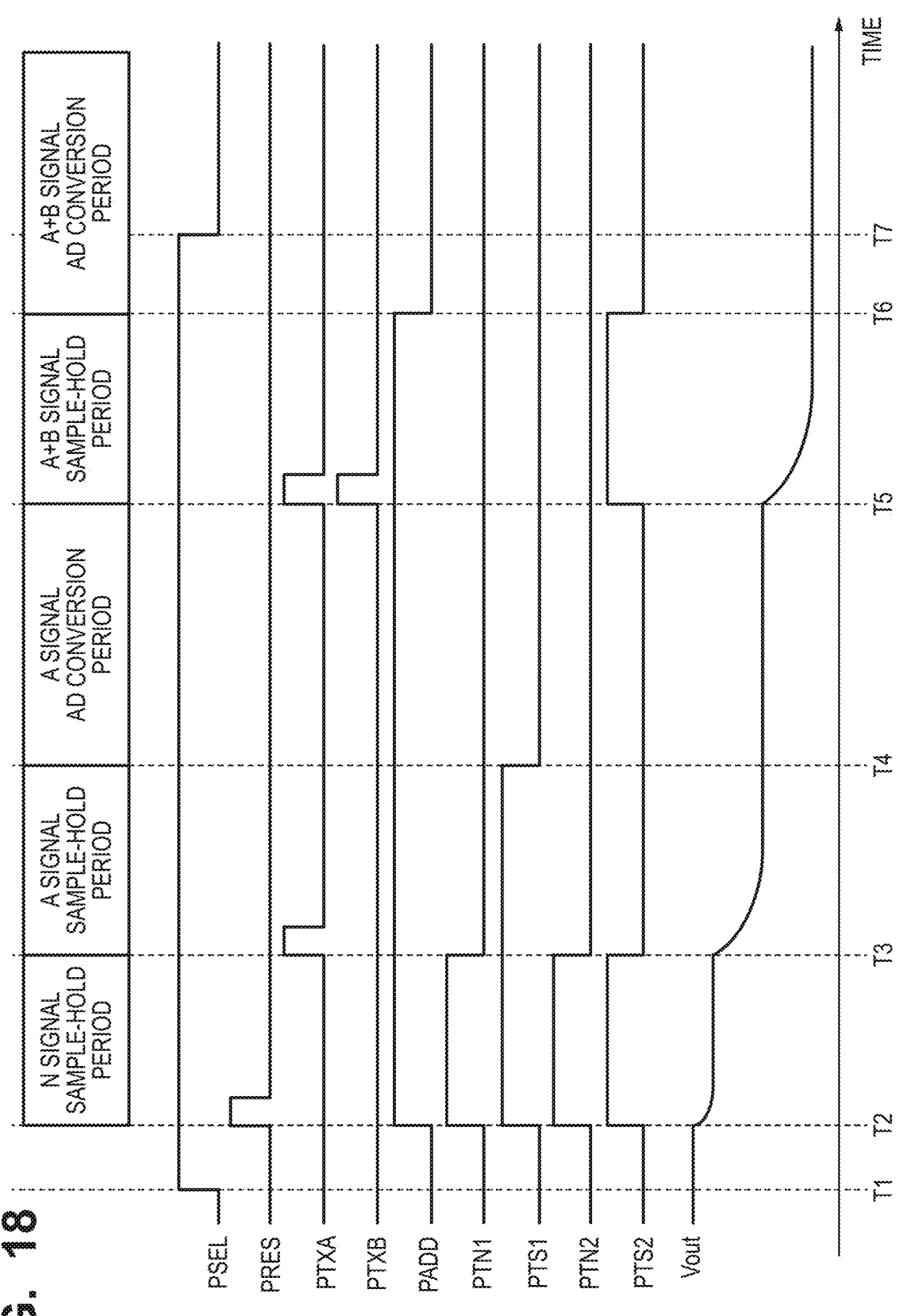
FIG. 18 is a timing chart of the sixth embodiment.

FIG. 18 is a timing chart illustrating an example of a pixel signal read-out operation in a path from a pixel to a column circuit unit, in the sixth embodiment. The basic operations are the same as the first embodiment, and therefore description will be give focusing on the differences.

At time T2, a reset potential is output to the column output lines 23_1 and 23_2 by the control signal PRES. This potential becomes held in the capacitors 503 and capacitors 504 of the column circuits 41_1 and 41_2 as the N signal in a period until time T3, due to the switches 501 and switches 502 being turned on and off by the control signals PTN1, PTS1, PTN2, and PTS2. Here, the switch 701 is turned on due to the control signal PADD being activated, and therefore the column output lines 23_1 and 23_2 are short-circuited to be the same potential.

At time T3, the control signals PTN1, PTN2, and PTS2 are deactivated while the control signals PTS1 and PADD are kept activated. Here, the control signal PTXA (refer to FIG. 3) is controlled to transition from a L level to a H level. With this, the first transfer transistor 303 is turned on, and the potential according to the amount of charges accumulated in the first photoelectric conversion portion 301 becomes held in the capacitor 504 of the column circuit 41_1 as the A signal (refer to FIG. 15).

At time T4, a current signal subjected to correction processing by correlated double sampling based on the N signal and and A signal of the column circuit 41_1 is input to the AD converter 45 (refer to FIGS. 14 and 15), and is converted to a digital signal.

At time T5, the control signals PTS2 is activated while the control signals PTN1, PTS1, and PTN2 are kept deactivated. Here, the control signal PTXA is controlled to transition from a L level to a H level, and the control signal PTXB is controlled to transition from a L level to a H level such that the control signal PTXB is at a H level in at least a portion of a H level period of the control signal PTXA. Accordingly, the first transfer transistor 303 and second transfer transistor 304 are turned on, and the potential according to the amount of charges accumulated in the first photoelectric conversion portion 301 and second photoelectric conversion portion 302 becomes held in the capacitor 504 of the column circuit 41_2 as the A+B signal.

At time T6, a current signal subjected to correction processing by correlated double sampling based on the N signal and and A+B signal of the column circuit 41_2 is input to the AD converter 45, and is converted to a digital signal.

In the sixth embodiment, the A signal is AD converted using the first sample-hold circuit 42_1 and second sample-hold circuit 43_1 of the column circuit 41_1, and the A+B signal is AD converted using the first sample-hold circuit 42_2 and second sample-hold circuit 43_2 of the column circuit 41_2. Therefore, the photodetection signal (A signal) for focus detection can be read out, without the need of adding the third sample-hold circuit need not be added.

Note that, in the present embodiment, the pixel signals of the first column and second column are mixed (addition averaging). Therefore, it is effective in applications such as image reduction and live view (LV). Also, in the present embodiment, a configuration has been shown in which signals are mixed, in column output lines, by short-circuiting the column output lines, but there is no limitation to this. For example, a configuration may also be adopted in which signals are mixed in a capacitor in the column circuit, for example.

With the configuration described above, an image capturing apparatus can be provided in which signals of a plurality of photoelectric conversion elements can be read out, while suppressing the increase in the area of the sample-hold circuits, and the noise in the pixel signal can also be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2023-103598, filed Jun. 23, 2023, and 2024-060971, filed Apr. 4, 2024 which are hereby incorporated by reference herein in their entirety.

What is claimed is:

1. An image capturing apparatus comprising:
   a pixel portion in which pixels each including first to fourth photoelectric conversion elements that are four photoelectric conversion elements are arranged in a matrix;
   first and second sample-hold circuits that are two sample-hold circuits arranged with respect to pixel signals output from one pixel;
   a voltage-current conversion circuit configured to output a difference between the first and second sample-hold circuits, as a current signal;
   an AD converter configured to convert an output signal of the voltage-current conversion circuit to a digital signal; and
   a controller configured to perform control such that, a first pixel signal obtained from the first photoelectric conversion element is held in the second sample-hold circuit and is AD converted as a first digital signal, in a first period, the first pixel signal and a second pixel signal that is obtained from the second photoelectric conversion element are held in the second sample-hold circuit and the held signal is AD converted as a second digital signal, in a second period, and the first pixel signal, the second pixel signal and a third pixel signal that is obtained from the third photoelectric conversion element are held in the second sample-hold circuit and the held signal is AD converted as a third digital signal, in a third period,
   wherein the controller subtracts the first digital signal from the second digital signal and subtracts the second digital signal from the third digital signal.

2. The image capturing apparatus according to claim 1, wherein the controller causes the first sample-hold circuit to hold a reset signal of the pixel.

3. The image capturing apparatus according to claim 1, wherein the first period and the second period are not overlapped.

4. The image capturing apparatus according to claim 3, wherein the second period is a period after the first period.

5. The image capturing apparatus according to claim 1, wherein that first period is shorter than the second period.

6. The image capturing apparatus according to claim 1, wherein the first to fourth pixel signals are signals based on charges of photoelectric conversion elements of the same pixel.

7. The image capturing apparatus according to claim 1, wherein the AD converter is a delta-sigma type AD converter.

8. A method of controlling an image capturing apparatus including: a pixel portion in which pixels each including a photoelectric conversion elements that are four photoelectric conversion elements are arranged in a matrix; first and second sample-hold circuits that are two sample-hold circuits arranged with respect to pixel signals output from one pixel; a voltage-current conversion circuit configured to output a difference between the first and second sample-hold circuits, as a current signal; and an AD converter configured to convert an output signal of the voltage-current conversion circuit to a digital signal, the method comprising:

performing control such that, a first pixel signal obtained from the first photoelectric conversion element is held in the second sample-hold circuit and is AD converted as a first digital signal, in a first period, the first pixel signal and a second pixel signal that is obtained from the second photoelectric conversion element are held in the second sample-hold circuit and the held signal is AD converted as a second digital signal, in a second period, and the first pixel signal, the second pixel signal and a third pixel signal that is obtained from the third photoelectric conversion element are held in the second sample-hold circuit and the held signal is AD converted as a third digital signal, in a third period, wherein the controller subtracts the first digital signal from the second digital signal and subtracts the second digital signal from the third digital signal.

9. A non-transitory computer-readable storage medium that stores a program for causing a computer to execute a method of controlling an image capturing apparatus including: a pixel portion in which pixels each including a photoelectric conversion elements that are four photoelectric conversion elements are arranged in a matrix; first and second sample-hold circuits that are two sample-hold circuits arranged with respect to pixel signals output from one pixel; a voltage-current conversion circuit configured to output a difference between the first and second sample-hold circuits, as a current signal; and an AD converter configured to convert an output signal of the voltage-current conversion circuit to a digital signal, the method comprising:

performing control such that, a first pixel signal obtained from the first photoelectric conversion element is held in the second sample-hold circuit and is AD converted as a first digital signal, in a first period, the first pixel signal and a second pixel signal that is obtained from the second photoelectric conversion element are held in the second sample-hold circuit and the held signal is AD converted as a second digital signal, in a second period, and the first pixel signal, the second pixel signal and a third pixel signal that is obtained from the third photoelectric conversion element are held in the second sample-hold circuit and the held signal is AD converted as a third digital signal, in a third period, wherein the controller subtracts the first digital signal from the second digital signal and subtracts the second digital signal from the third digital signal.

* * * * *